(12) United States Patent
Nourmohamadian et al.

(10) Patent No.: US 7,359,848 B1
(45) Date of Patent: Apr. 15, 2008

(54) TAPE STORAGE EMULATOR

(75) Inventors: Mohamad Nourmohamadian, Laguna Hills, CA (US); James Walch, Mission Viejo, CA (US)

(73) Assignee: Ultera Systems, Inc., Laguna Hills, CA (US)

( * ) Notice: Subject to any disclaimer, the term of this patent is extended or adjusted under 35 U.S.C. 154(b) by 0 days.

(21) Appl. No.: 11/732,706

(22) Filed: Apr. 3, 2007

Related U.S. Application Data

(63) Continuation of application No. 10/655,763, filed on Sep. 5, 2003, now Pat. No. 7,200,546.

(60) Provisional application No. 60/408,526, filed on Sep. 5, 2002, provisional application No. 60/417,024, filed on Oct. 8, 2002, provisional application No. 60/425,564, filed on Nov. 12, 2002, provisional application No. 60/459,081, filed on Mar. 31, 2003, provisional application No. 60/473,236, filed on May 24, 2003.

(51) Int. Cl.
*G06F 9/455* (2006.01)

(52) U.S. Cl. .................... 703/24; 710/302; 710/33; 710/315; 711/112; 711/6; 711/114; 711/4; 711/162; 711/154; 711/170; 360/49; 713/1

(58) Field of Classification Search .................. 703/24; 710/302, 33; 711/112, 6, 114; 360/49; 713/1
See application file for complete search history.

(56) References Cited

U.S. PATENT DOCUMENTS 5,297,124 A * 3/1994 Plotkin et al. ................. 360/49
5,438,674 A * 8/1995 Keele et al. ..................... 711/4
5,455,926 A * 10/1995 Keele et al. ..................... 711/4
5,530,845 A * 6/1996 Hiatt et al. ..................... 703/27
5,925,119 A * 7/1999 Maroney ..................... 710/315
6,070,224 A * 5/2000 LeCrone et al. ............ 711/112
6,098,148 A * 8/2000 Carlson ....................... 711/112
6,237,062 B1 * 5/2001 Carlson et al. ............ 711/112
6,256,706 B1 * 7/2001 Carlson et al. ............ 711/112
6,275,855 B1 * 8/2001 Johnson ...................... 709/224
6,336,163 B1 * 1/2002 Brewer et al. ............. 711/112
6,529,996 B1 * 3/2003 Nguyen et al. ............. 711/114
6,640,278 B1 * 10/2003 Nolan et al. ................... 711/6
6,954,768 B2 * 10/2005 Carlson et al. ............. 707/205
6,954,831 B2 * 10/2005 Carlson et al. ............. 711/154

(Continued)

*Primary Examiner*—Kamini Shah
*Assistant Examiner*—Cuong Van Luu
(74) *Attorney, Agent, or Firm*—Law Office of Glenn Smith; Glenn R. Smith; Lei Liu

(57) ABSTRACT

A tape storage emulator has a disk storage, a tape storage, a server interface, a data path control, a virtual tape management and a personality logic. The server interface is in communications with a server so as to receive and transmit tape storage commands and tape formatted data compatible with the tape storage. The data path control is in communications with the server interface and the disk storage so as to transfer the tape formatted data between the disk storage and the server interface. The virtual tape management is in communication with the disk storage so as to store the tape formatted data on the disk storage. The personality logic is at least temporarily in communications with the tape storage so as to capture and store tape storage responses. The stored tape storage responses allow the virtual tape management to emulate the tape storage to the server using the disk storage.

1 Claim, 42 Drawing Sheets

U.S. PATENT DOCUMENTS

| | | |
|---|---|---|
| 6,957,291 B2 * | 10/2005 | Moon et al. .................. 710/302 |
| 6,978,325 B2 * | 12/2005 | Gibble et al. .................. 710/33 |
| 2001/0047471 A1 * | 11/2001 | Johnson .......................... 713/1 |
| 2002/0002631 A1 * | 1/2002 | Haulund et al. ............. 709/314 |
| 2002/0188592 A1 * | 12/2002 | Leonhardt et al. .............. 707/1 |
| 2004/0008484 A1 * | 1/2004 | Konshak et al. ............. 361/687 |
| 2004/0010660 A1 * | 1/2004 | Konshak et al. ............. 711/114 |
| 2005/0204108 A1 * | 9/2005 | Ofek et al. .................. 711/162 |
| 2005/0207109 A1 * | 9/2005 | Rabinovitz ................... 361/685 |
| 2006/0010275 A1 * | 1/2006 | Moon et al. .................. 710/302 |

* cited by examiner

TAPE STORAGE EMULATOR

CROSS-REFERENCE TO RELATED APPLICATIONS

This application is a continuation of U.S. patent application Ser. No. 10/655,763, now U.S. Pat. No. 7,200,546, entitled Tape Storage Emulator filed Sep. 5, 2003, which relates to and claims the benefit of the following prior U.S. Provisional Applications: Application No. 60/408,526 entitled Virtual Tape Storage System filed Sep. 5, 2002; Application No. 60/417,024 entitled Dual Access Tape filed Oct. 8, 2002; Application No. 60/425,564 entitled Virtual Tape Controller filed Nov. 12, 2002; Application No. 60/459,081 entitled Virtual Tape Controller filed Mar. 31, 2003; and Application No. 60/473,236 entitled Virtual Tape Library filed May 24, 2003. All of the aforementioned provisional and patent applications are hereby incorporated by reference herein.

BACKGROUND OF THE INVENTION

Computer systems utilize backup to create duplicate copies of programs, disks or data for archiving purposes or to safeguard valuable files from loss should an active copy be damaged or destroyed. FIG. 1 illustrates a conventional tape backup system 100 having a server 110, an application program 130, a communications channel 150 and tape storage 170. The server 110 runs the application program 130 which manages tape storage 170. Tape storage 170 may be one or more tape drive devices or one or more tape library devices. The data channel 150 provides bi-directional communication for transferring commands and data between the application program 130 and tape storage 170. In particular, backup data is written from the server 110 to tape storage 170, and restore data is read from tape storage 170 to the server 110. Also, commands are sent from the server 110 to tape storage 170 and status data is sent from tape storage 170 to the server 110 in response. For example, an inquiry command may yield a tape device model and serial number in response, a mode sense command may yield a block size value in response, and a log command may yield error data in response.

SUMMARY OF THE INVENTION

The installed base of backup application programs are configured for tape storage. Historically, tape storage is utilized for backup due to low media cost, large storage capacity and removable media characteristics. Tape storage, however, provides relatively slow data transfer rates and can only be accessed sequentially. By contrast, when disk storage is viewed as a tape, it provides relatively fast data transfer rates and random access. Further, advances in disk technology have increased disk performance, storage capacity and data reliability as well as reduced cost. The data formats of disk storage and tape storage, however, are incompatible, as described below. A virtual tape system based upon disk storage technology advantageously converts between tape and disk data formats. Further, by emulating tape devices, the virtual tape system performs this conversion transparently to existing backup application programs.

FIGS. 2A-B illustrate a conventional tape storage data format 200 and a conventional disk storage data format 250, respectively. As shown in FIG. 2A, the tape format 200 has a beginning of tape (BOT) 210, an early warning zone 220, an end of tape (EOT) 230 and fixed or variable length data blocks 240. Files containing multiple data blocks 240 may be delineated by file marks (not shown). As shown in FIG. 2B, the disk format 250 has multiple concentric tracks 260 each divided into multiple sectors 270, where each sector 270 of each track 260 forms a data block of fixed size.

One aspect of a tape storage emulator is a method comprising the steps of providing response data corresponding to a tape storage device and receiving a non-media command from a server. The response data is sent to the server in response to the non-media command. A media command is received from the server. The media command is applied to a virtual tape volume configured on a disk storage device.

Another aspect of a tape storage emulator is a server interface adapted to communicate with a server and a data path adapted to communicate with a random access data storage. A personality logic is configured to provide response data corresponding to a sequential access data storage. A virtual tape manager is configured to store virtual tape data on the random access data storage. The virtual tape manager is responsive to a media command so as to transfer the virtual tape data between the random access data storage and the server. The personality logic is responsive to a non-media command so as to transfer the response data to the server.

A further aspect of a tape storage emulator is a disk storage, a tape storage, a server interface, a data path control, a virtual tape management and a personality logic. The server interface is in communications with a server so as to receive and transmit tape storage commands and tape formatted data compatible with the tape storage. The data path control is in communications with the server interface and the disk storage so as to transfer the tape formatted data between the disk storage and the server interface. The virtual tape management is in communication with the disk storage so as to store the tape formatted data on the disk storage. The personality logic is at least temporarily in communications with the tape storage so as to capture and store tape storage responses. The stored tape storage responses allow the virtual tape management to emulate the tape storage to the server using the disk storage.

DETAILED DESCRIPTION OF THE
PREFERRED EMBODIMENTS

Overview

Figure 1:
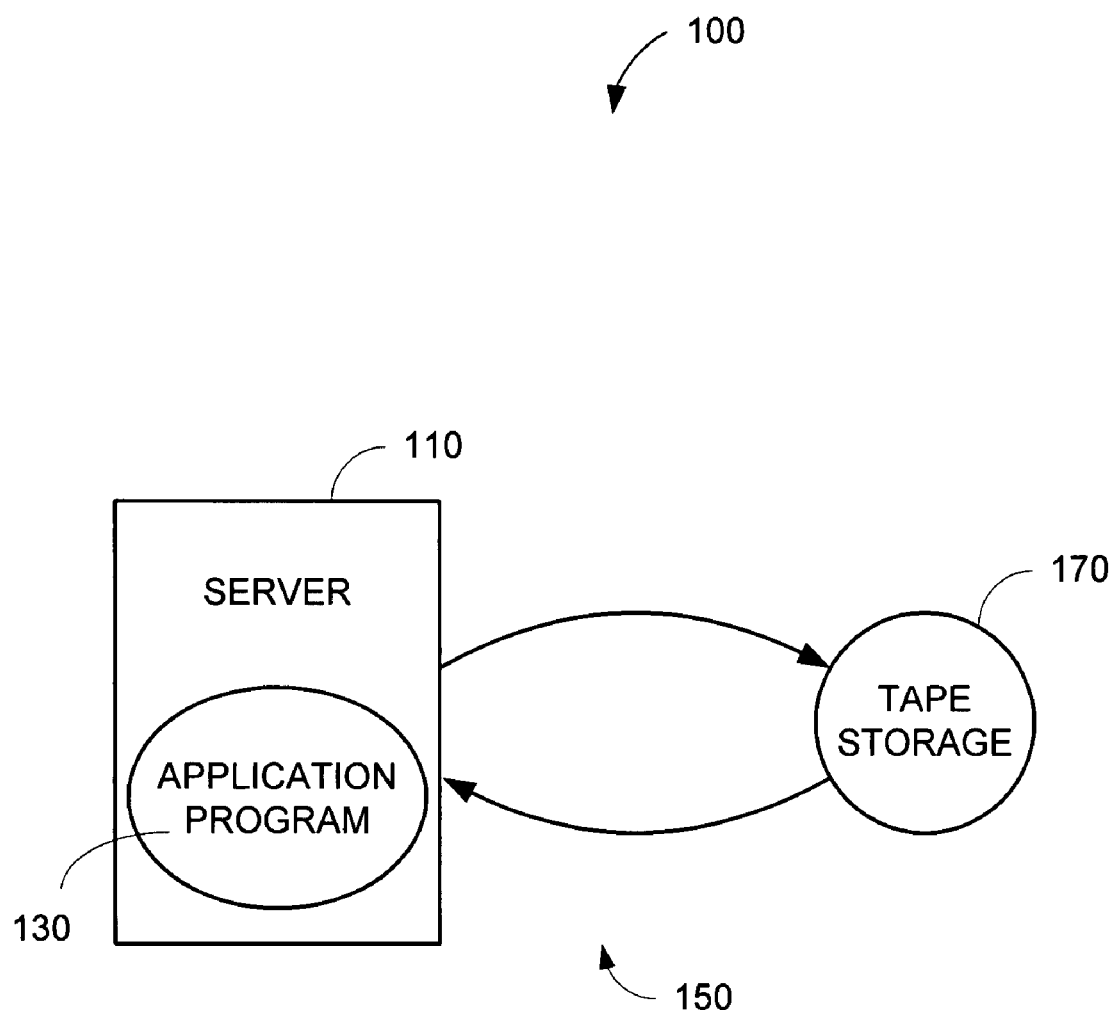
FIG. 1 is a general block diagram of a prior art tape backup system.
Figure 3:
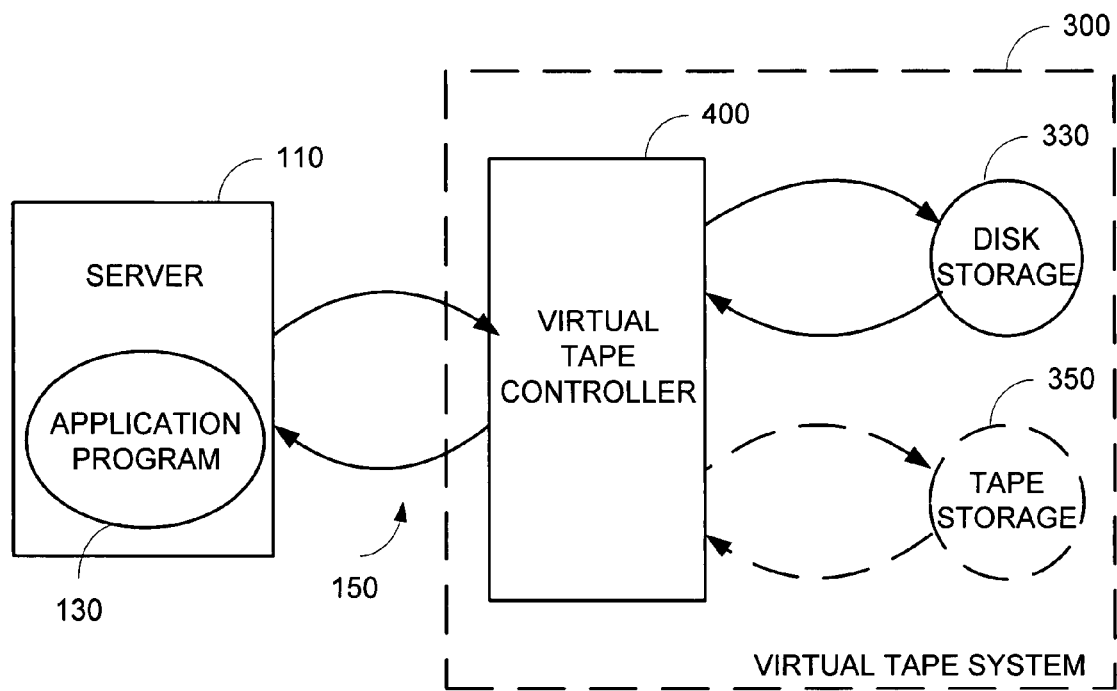
FIG. 3 is a general block diagram of a virtual tape system.

FIG. 3 illustrates a virtual tape system 300 which advantageously enhances the features and functions of a conventional tape backup system 100 (FIG. 1), described above. The virtual tape system 300 has a virtual tape controller 400, disk storage 330 and optional tape storage 350. The virtual tape controller 400 utilizes the disk storage 330 to create virtual tape storage. In this manner, the virtual tape system 300 appears to the application program 130 as conventional tape storage 170 (FIG. 1), but with the random file access and high data transfer rates of disk storage. Thus, advantageously, the virtual tape system 300 transparently provides performance enhancements and reliability enhancements to backup, restore and archival applications while preserving investments already made in storage equipment and application software.

Figure 2A:
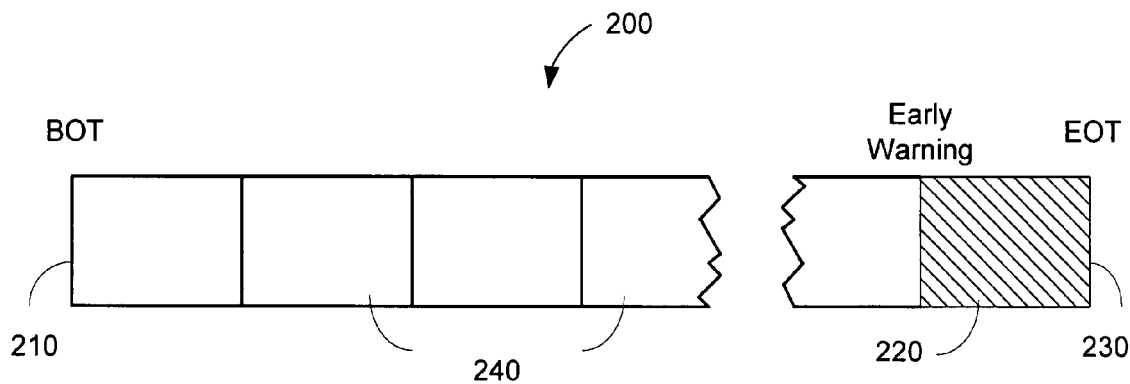
FIGS. 2A-B are data format diagrams for tape storage and disk storage, respectively.
Figure 2B:
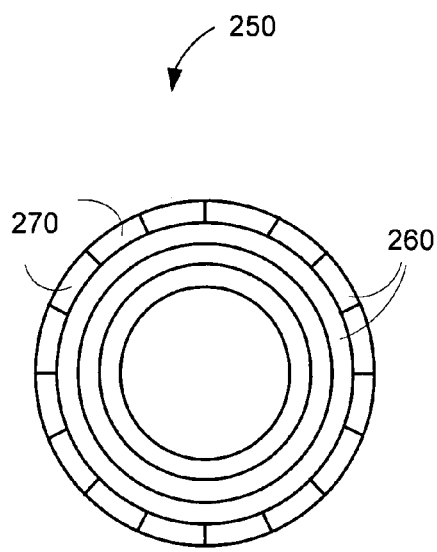
Figure 4:
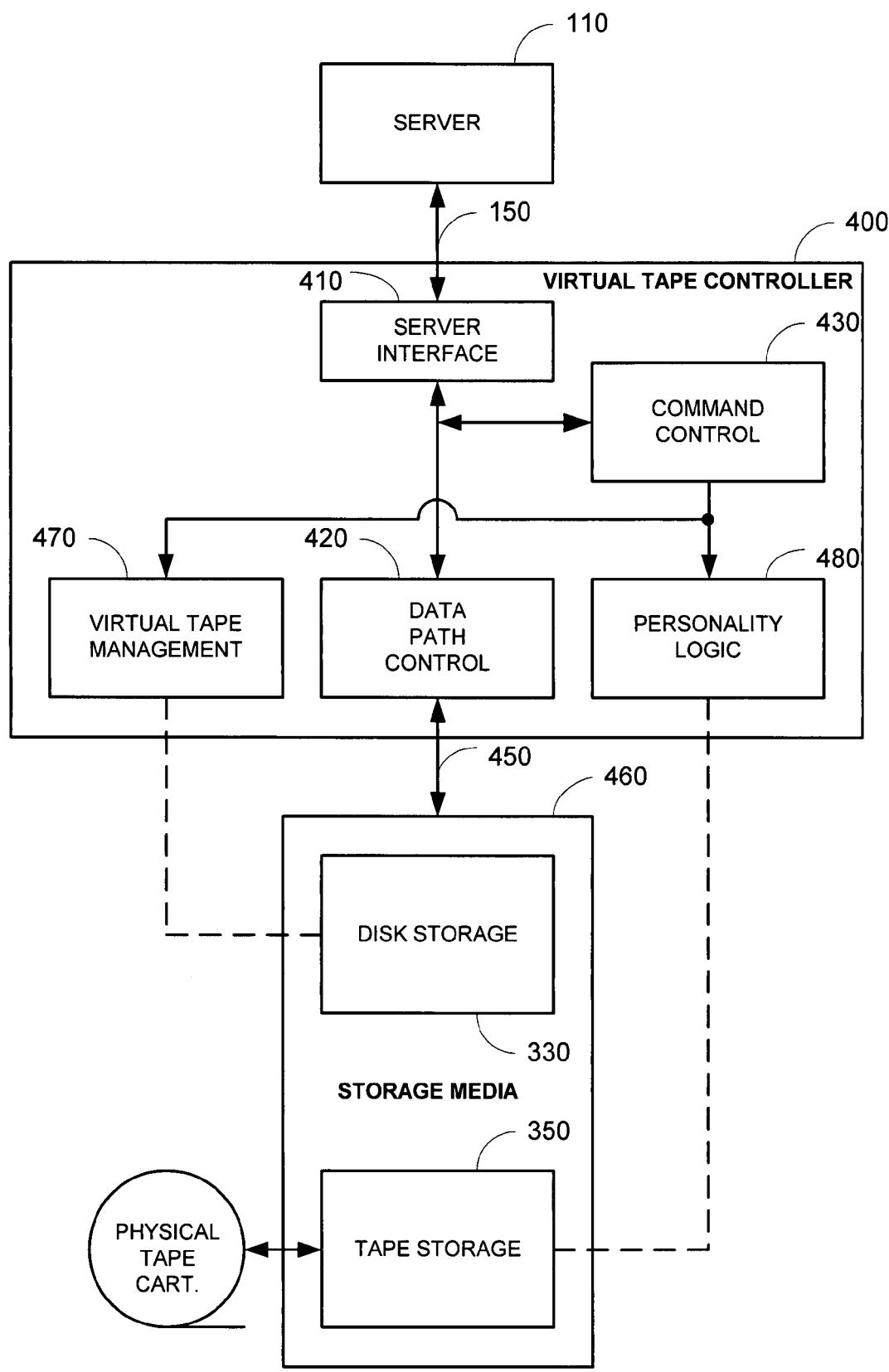
FIG. 4 is a general block diagram of a virtual tape controller.

FIG. 4 illustrates a virtual tape controller (VTC) 400 having a server interface 410 and a data path control 420, which are hardware-based resources, and a command control 430, virtual tape management 470 and personality logic 480, which are firmware modules that utilize those resources. The server interface 410 provides a communications channel 150 between the server 110 and the VTC 400. For example, the communications channel 150 can be any of various standard high speed data transfer interfaces, such as SCSI, Fibre Channel, iSCSI, IDE and ATA to name a few. The data path control 420 provides a communications channel 450 between the VTC 400 and the storage media 460 that is both flexible and scalable. The command control 430 intercepts, modifies and rearranges commands and responses between the server 110 and the storage media 460. The virtual tape management 470 performs the data conversion between the tape data format 200 (FIG. 2A) utilized by the server 110 and the disk data format 250 (FIG. 2B) provided by the disk storage 330. In particular, the virtual tape management 470 manages virtual tape volumes 500 (FIGS. 5A-C), lookup tables 600 (FIG. 6) and virtual sequential stackers 800 (FIGS. 8A-B), as described below. The personality logic 480 emulates particular tape devices that are either optionally attached as tape storage 350 or are user defined, as described with respect to FIG. 7, below.

Figure 5A:
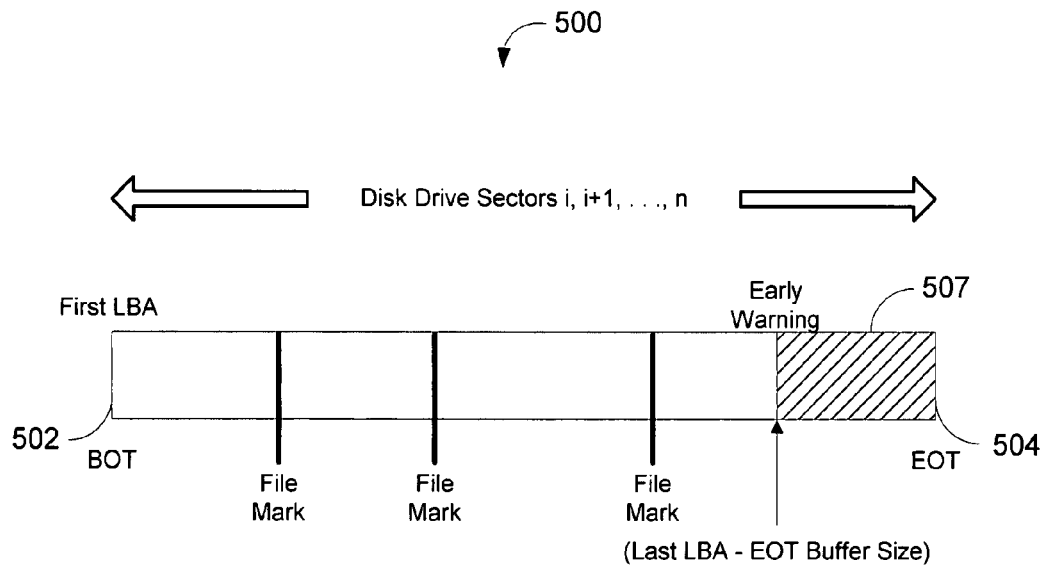
FIGS. 5A-C are partition diagrams of virtual tape volumes on disk storage.
Figure 5B:
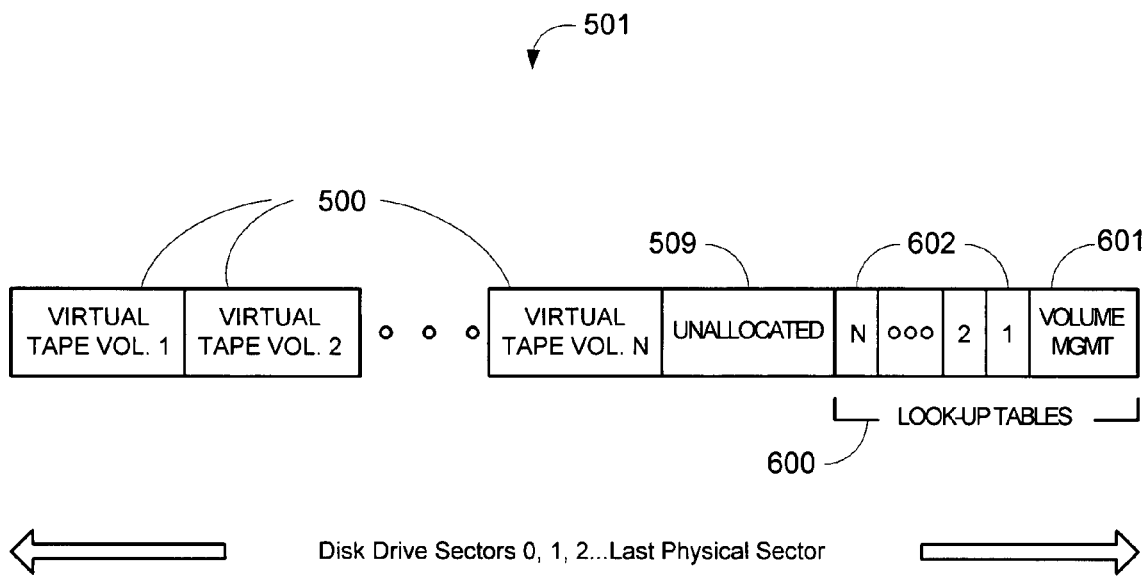
Figure 5C:
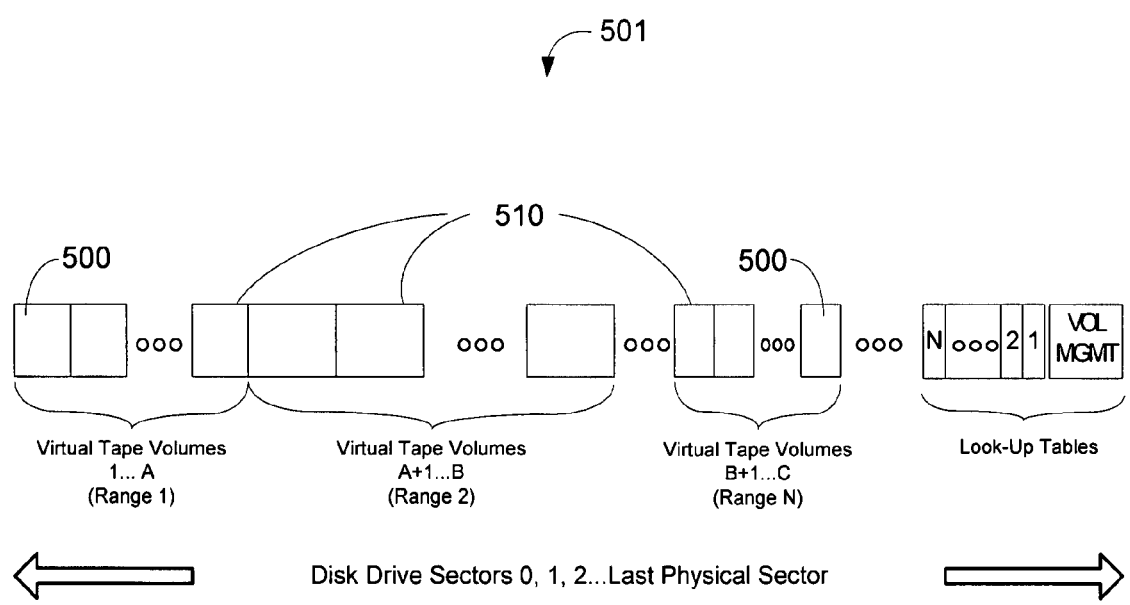

FIGS. 5A-C illustrate virtual tape volumes 500, which reside on disk storage 330 (FIG. 4). As shown in FIG. 5A, each virtual tape volume 500 appears to the server 110 (FIG. 4) as a physical tape volume, such as a tape cartridge. A virtual tape volume 500 spans from the beginning of a sector having a first logical block address (LBA) and representing the BOT 502 to the end of a sector having a last LBA and representing the EOT 504. The storage capacity size of early warning zone area 507 is calculated using an EOTBufferSize parameter times the size of a disk sector. The EOTBufferSize parameter should be set to a value so the storage capacity size of early warning zone area 507 is at least 10 MB or to meet the requirements of the application program 130. The starting disk sector for the early warning zone area 507 is calculated by subtracting the EOTBufferSize parameter from the last LBA of the virtual tape volume. As tape blocks are written to the virtual tape volume, when the tape block position reaches the starting disk sector for the early warning zone area 507, the write command is processed OK and a check condition status is posted with request sense data indicating that the early warning zone 507 has been detected.

As shown in FIG. 5B, in one embodiment a disk storage space 501 is partitioned into multiple virtual tape volumes 500 each having the same size storage capacity, unallocated space 509 and look-up tables 600. The unallocated space 509 occurs when the total allocated storage capacity for all of the virtual tape volumes is less than the available disk storage space. To utilize all of the available disk storage space, the virtual volume size can be based on the total available disk storage space divided by the number of virtual volumes "N." The virtual volume size is based on the total available disk storage space divided by the number of virtual volumes "N." Typically, the virtual volume size is set equal to the native tape capacity of a physical archival tape cartridge to ensure that even data with a low compression ratio will fit on a physical tape cartridge. The look-up tables 600 include a volume management table 601 and one or more data management tables 602 each associated with a corresponding one of the virtual tape volumes 500. After configuring the number of virtual tape volumes 500, a corresponding number of data management lookup tables 602 are generated automatically in a reserved area of the disk storage device, setting each virtual tape volume to an initialized or blank tape state. The lookup tables 600 provide a conversion mechanism between the tape format 200 (FIG. 2A) utilized by the server application program 130 (FIG. 3) and the disk format 250 (FIG. 2B) inherent to disk storage 330 (FIG. 4), as described below.

As shown in FIG. 5C, in another embodiment a disk storage space 501 is partitioned into multiple virtual tape volumes 500 each having the same size storage capacity within a particular range of multiple ranges 510. Advantageously, virtual tape volumes within one range are set to one storage capacity size and virtual tape volumes within another range are set to a different storage capacity size. This corresponds to a conventional tape library that supports using tape cartridges with different storage capacities.

Figure 6:
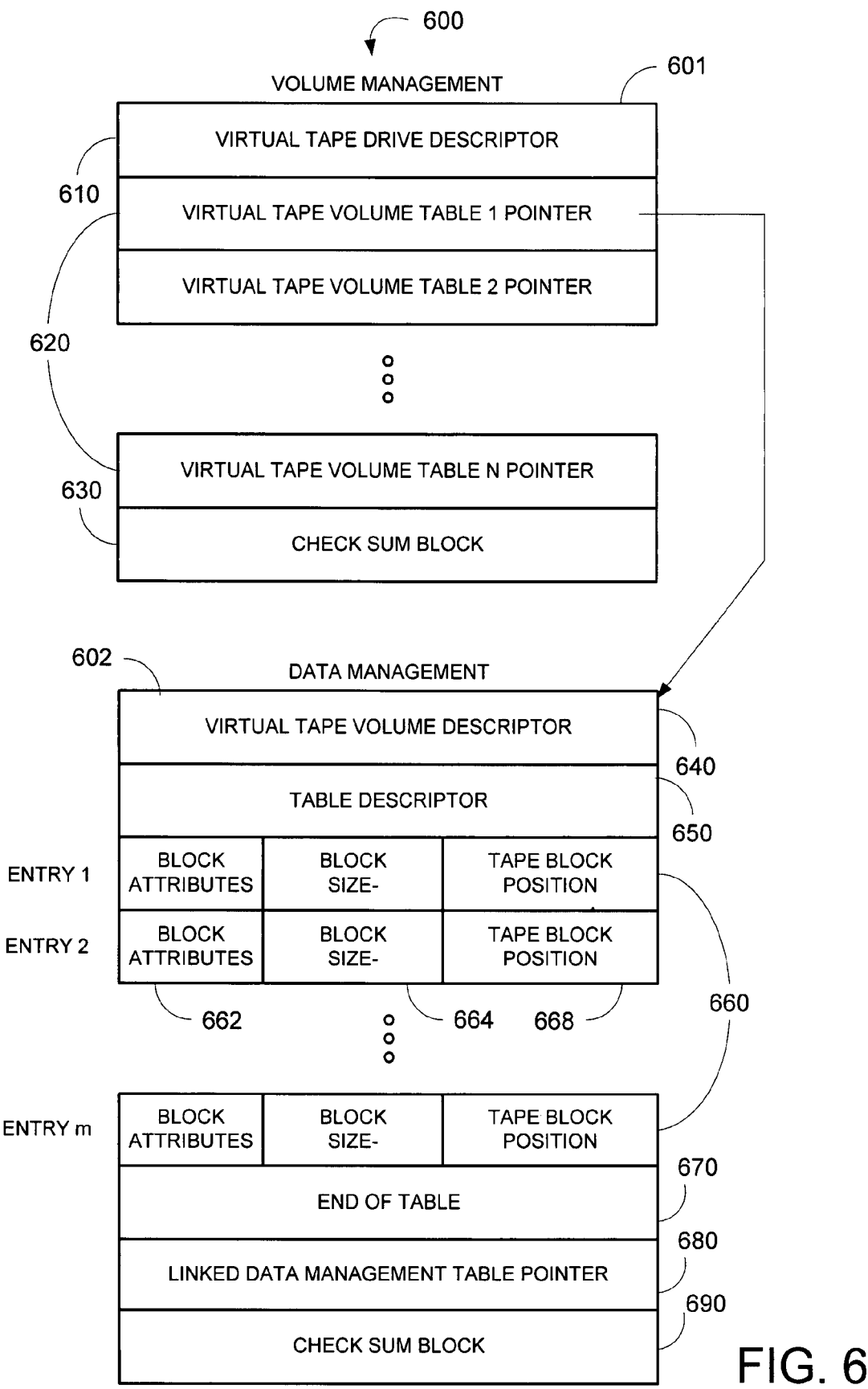
FIG. 6 is an organizational diagram of volume management and data management lookup tables.

FIG. 6 illustrates a lookup table 600 having a volume management lookup table 601 and one or more data management lookup tables 602. The volume management table 601 manages an entire disk storage space 501 (FIGS. 5B-C) spanning one or more disk drives. Each of the data management tables 602 manages a corresponding individual virtual tape volume 500 (FIGS. 5A-C). The volume management table 601 has a virtual tape drive descriptor 610, one or more virtual tape volume pointers 620 and a check sum block 630. The drive descriptor 610 stores an indication of the virtual tape drive status as full or empty, the number and storage capacity of each disk storage device, and the number and storage capacity of each virtual volume. The pointers 620 contain the starting LBA of each data management table 602. The check sum block 630 verifies the integrity of the volume management table data.

As shown in FIG. 6, a data management table 602 has a virtual tape volume descriptor 640, a table descriptor 650, multiple table entries 660, an end of table 670 and a check sum block 680. The volume descriptor 640 stores LBAs corresponding to the virtual tape volume BOT and EOT 502, 504 (FIG. 5A), an indication of the virtual tape volume status as full or empty, and the LBA of the start of the early warning zone. The table descriptor 650 stores the number of table entries 660 and the LBA corresponding to the end of virtual tape volume data. The table entries 660 each store block attributes 662, block size 664 and tape block position 668 for various tape events. In particular, the block attributes 662 stores flags that indicate the event type, such as file mark, set mark, hardware compression state, change in block size, beginning and end of media, disk rank spanning and partition number. The block size 664 stores the current tape data block size, and the tape block position 668 stores the tape block number and relative tape partition number corresponding to the event. The end of table 670 indicates the end of the entries 660. The linked data management table pointer 680 allows a virtual tape volume to span across disk boundaries. The check sum block 690 verifies the integrity of the data management table data.

Advantageously, independently recording file mark and block size events in the data management lookup table 602 provides a mechanism to support variable block tape formats and, in particular, block size changes between file marks. Once a virtual tape volume 500 (FIG. 5A) is mounted, it behaves and operates as if it was loaded in a conventional tape drive. All tape drive commands that access the virtual tape drive are managed by the VTC 400 (FIG. 4) using the look-up table 600 to track the current tape position, current tape block size and the block attributes.

Figure 7:
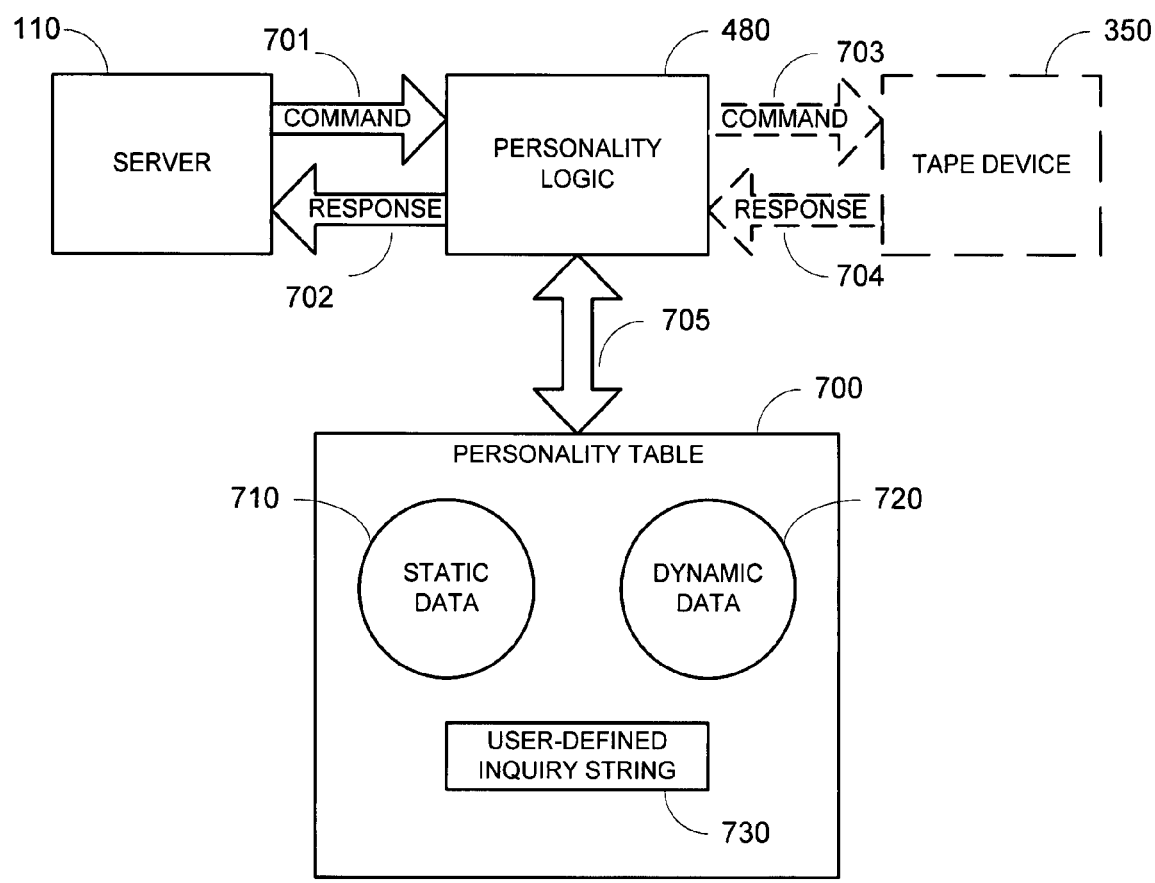
FIG. 7 is a functional block diagram of personality logic.

FIG. 7 illustrates personality logic 480 used to emulate a particular tape device 350. Advantageously, the personality logic 480 emulates a wide-variety of tape devices without the need to develop emulation programs for each device. Rather, the personality logic 480 captures the "personality" of an attached tape device, which is stored in a personality table 700. The personality logic 480 has three modes including a user-defined mode, a snap-shot mode and a pass-thru mode. In the user-defined mode, no tape device 350 is attached and a user-defined inquiry string 730 is the response 702 to an inquiry command 701. In a snap-shot mode, a tape device 350 is temporarily attached. The personality logic 480 then provides inquiry, read block limits, mode sense and log sense commands 703, which it either generates or passes to the tape device 350 from the server 110. The tape device response 704 is then stored 705 in the personality table 700. In an attached mode, a tape device 350 remains attached. Select non-media server commands 701 are passed 703 to the tape device 350 and tape device responses 704 are returned 702 to the server 110. A personality snap-shot is also taken in the attached mode in the event the tape device 350 fails or is removed.

As shown in FIG. 7, the personality table 700 resides in VTC memory 956 (FIGS. 9A-B) or on disk storage 330 (FIG. 4). The personality table 700 has static data 710 and dynamic data 720. Static data 710 is inquiry data that is stored 705 from a tape device response 704 to an inquiry command 703 or block length limits stored 705 from response 704 to a read block limits command 703. Dynamic data 720 is stored 705 in response to mode select commands 701, such as block size and compression mode attributes, and indicates the current state of tape data storage from the server 110 perspective. Mode select, mode sense, log select, log sense and request sense commands related to virtual tape volume operations are intercepted by the personality logic 480, which updates dynamic data 720 and/or responds from dynamic data 720. Static and dynamic response data related to common commands are described with respect to TABLES 1-2, below.

Figure 8A:
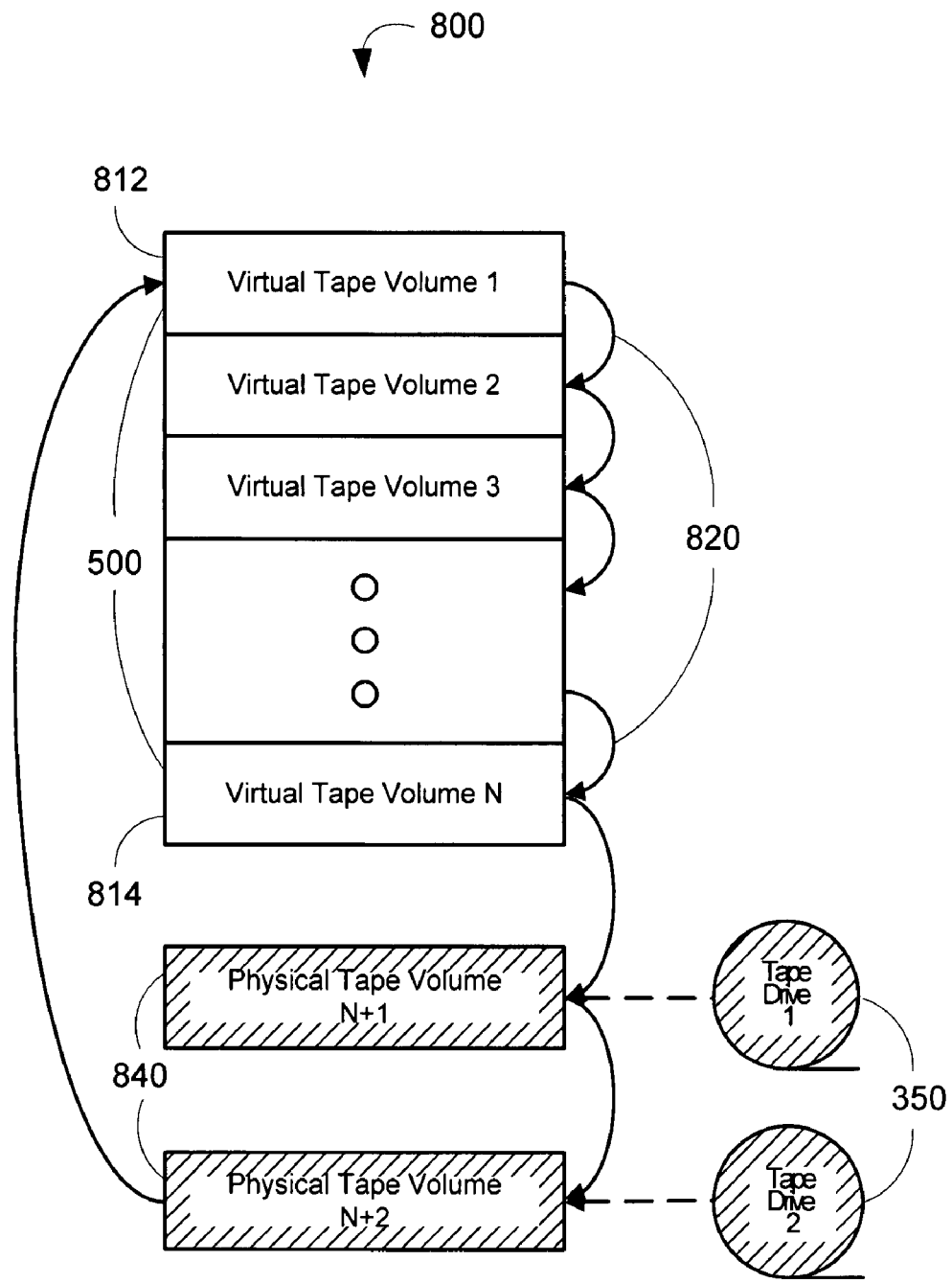
FIGS. 8A-B are block diagrams of virtual sequential stacker configurations.
Figure 8B:
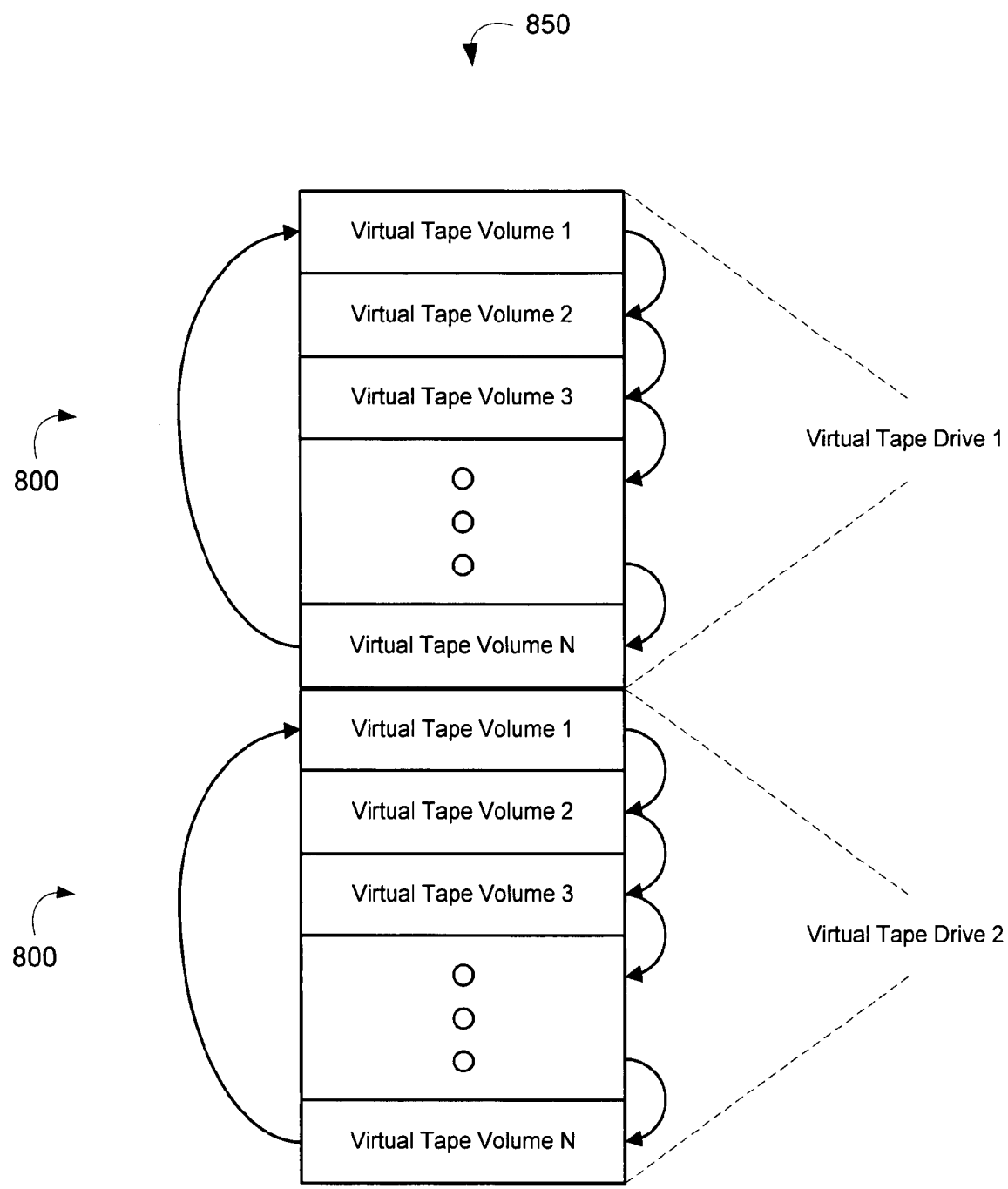

FIGS. 8A-B illustrate a sequential stacker mode, where the VTC 400 (FIG. 4) functions with the backup application program 130 (FIG. 3) as if it was a conventional sequential stacker/autoloader. The sequential stacker mode advantageously provides a backup application program with the unattended operation of a sequential stacker or tape autoloader and the storage capacity of a tape library even if that program does not have tape library functionality. Further, the sequential stacker mode optionally integrates one or more physical tape drives into a virtual tape volume configuration so as to seamless incorporate legacy backup tapes or archived tapes into the virtual tape environment, as described below.

As shown in FIG. 8A, a virtual sequential stacker 800 has multiple virtual tape volumes 500 organized in a sequential order 820. The first virtual tape volume 812 is automatically "mounted" into the virtual tape drive by default. Once a virtual tape volume 500 is mounted, it behaves and operates as if it was loaded in a conventional tape drive. If the application program 130 (FIG. 3) unloads a virtual tape volume 500, the next consecutive virtual tape volume 500 is automatically loaded. If the last virtual tape volume 814 is ejected, either the first virtual tape volume 812 is automatically mounted or the virtual tape drive remains empty based on a user configuration setting to simulate a conventional stacker that ejects the tape magazine when the last tape is processed. The number of virtual tape volumes 500 and the size of each virtual tape volume is user selectable.

As shown in FIG. 8A, one or more physical tape drives 350 may be incorporated into the virtual sequential stacker 800. The VTC 400 (FIG. 4) monitors any physical tape drive 350 that is present. If a physical tape cartridge is manually loaded into a tape drive 350 and it is "Write Protected," the virtual tape management 470 (FIG. 4) enables the application program 130 (FIG. 3) to access the tape data directly. The physical tape volume 840 automatically becomes part of the virtual tape volume storage rotation. After the last virtual tape volume 814 is un-mounted, the next tape to load into the virtual tape drive will be a write protected physical tape volume 840. Once mounted, the application program 130 (FIG. 3) will operate the tape drive 350 as if it was directly attached to the server 110 for restore operations. When a physical tape volume 840 is un-mounted, the next sequential physical tape volume 840 is mounted if a "Write Protected" tape cartridge is present. When the last physical tape volume 840 is un-mounted, the first virtual tape volume 812 is automatically loaded into the virtual tape drive. Depending on a user configuration setting, the write protected physical tape cartridge may remain in the archival tape drive until it is manually removed or it may be ejected.

As shown in FIG. 8B, a split-mode virtual sequential stacker 850 advantageously operates as two or more virtual sequential stackers 800 sharing the same disk storage space 501 (FIGS. 5A-B). Each of the virtual sequential stackers 800 operates independently as described with respect to FIG. 8A, above. One or more physical tape drives 350 (FIG. 8A) can be incorporated with each of the virtual sequential stackers 800, also as described above.

A single virtual sequential stacker 800 can also operate utilizing multiple virtual tape drives. A multi-drive virtual sequential stacker advantageously operates on a first-come-first-serve bases where the next available virtual tape volume is mounted into the first available virtual tape drive automatically. Since the virtual tape volumes can be mounted into any of the virtual tape drives, the virtual tape drives are better utilized as compared to the split mode operation. One or more physical tape drives 350 (FIG. 8A) can be incorporated with the multi-drive virtual sequential stacker, also as described above.

A virtual tape system is described above with respect to multiple virtual volumes 500 organized as one or more sequential stackers 800. In alternative embodiments, a virtual tape system and multiple virtual volumes may be organized and managed by a VTC 400 (FIG. 4) so as to emulate a tape library media changer/robot. A virtual tape library supports all library media changer/robot commands. Further, a virtual tape system may appear as multiple tape libraries by providing multiple independent media changer devices with independent virtual tape volume slot ranges sharing common virtual tape volume storage.

A virtual tape system was described above as integrating physical archive devices into the virtual tape volume configuration. Other virtual tape system embodiments utilizing a VTC 400 (FIG. 4) allow data to transferred between a virtual volume and a physical tape cartridge as a background task so as to provide for auto archive, selective archive, simultaneous backup and archive and least recently used (LRU) migration methods.

Virtual tape Controller Hardware

Figure 9A:
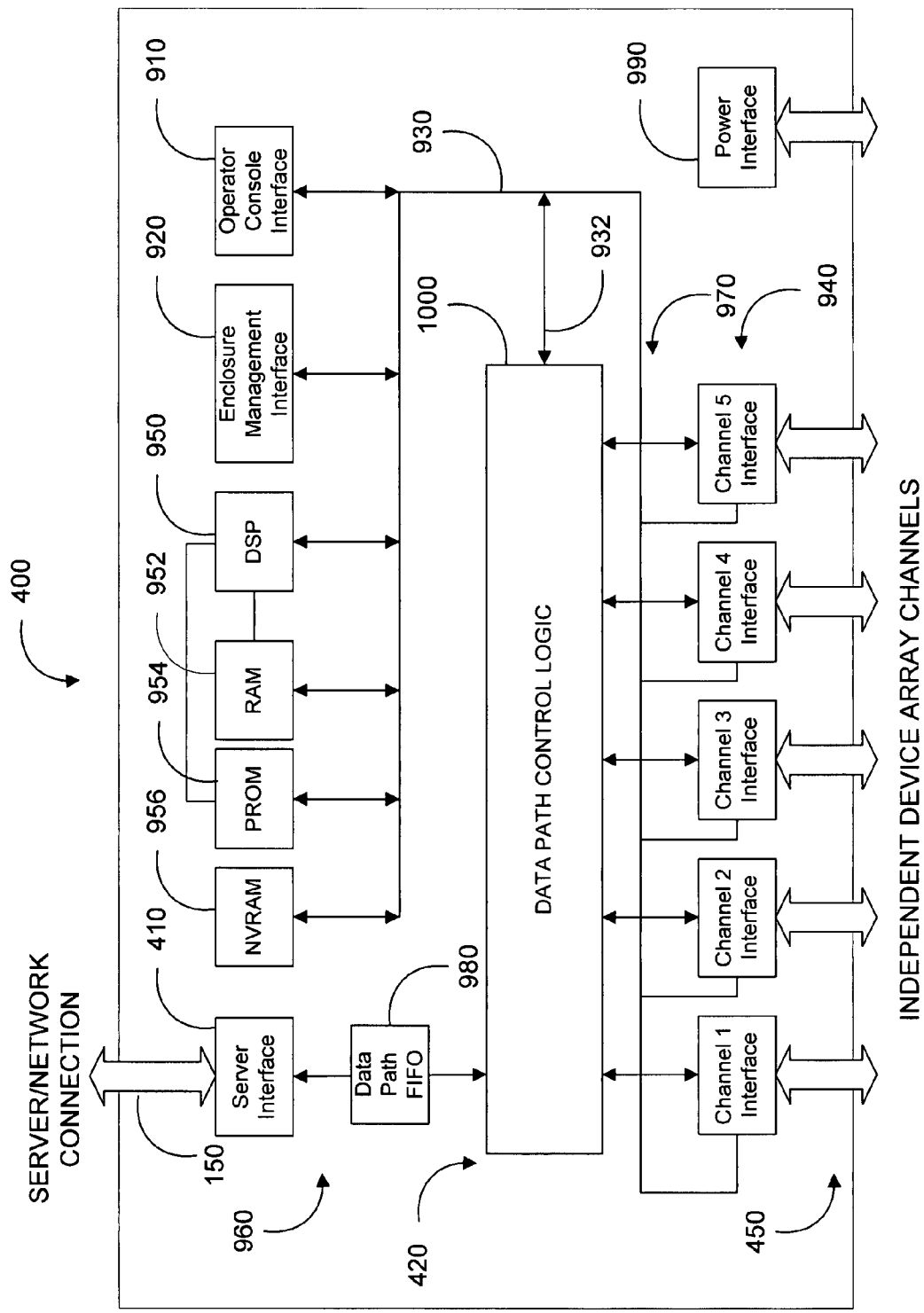
FIGS. 9A-B are detailed block diagrams of virtual tape controller embodiments.
Figure 9B:
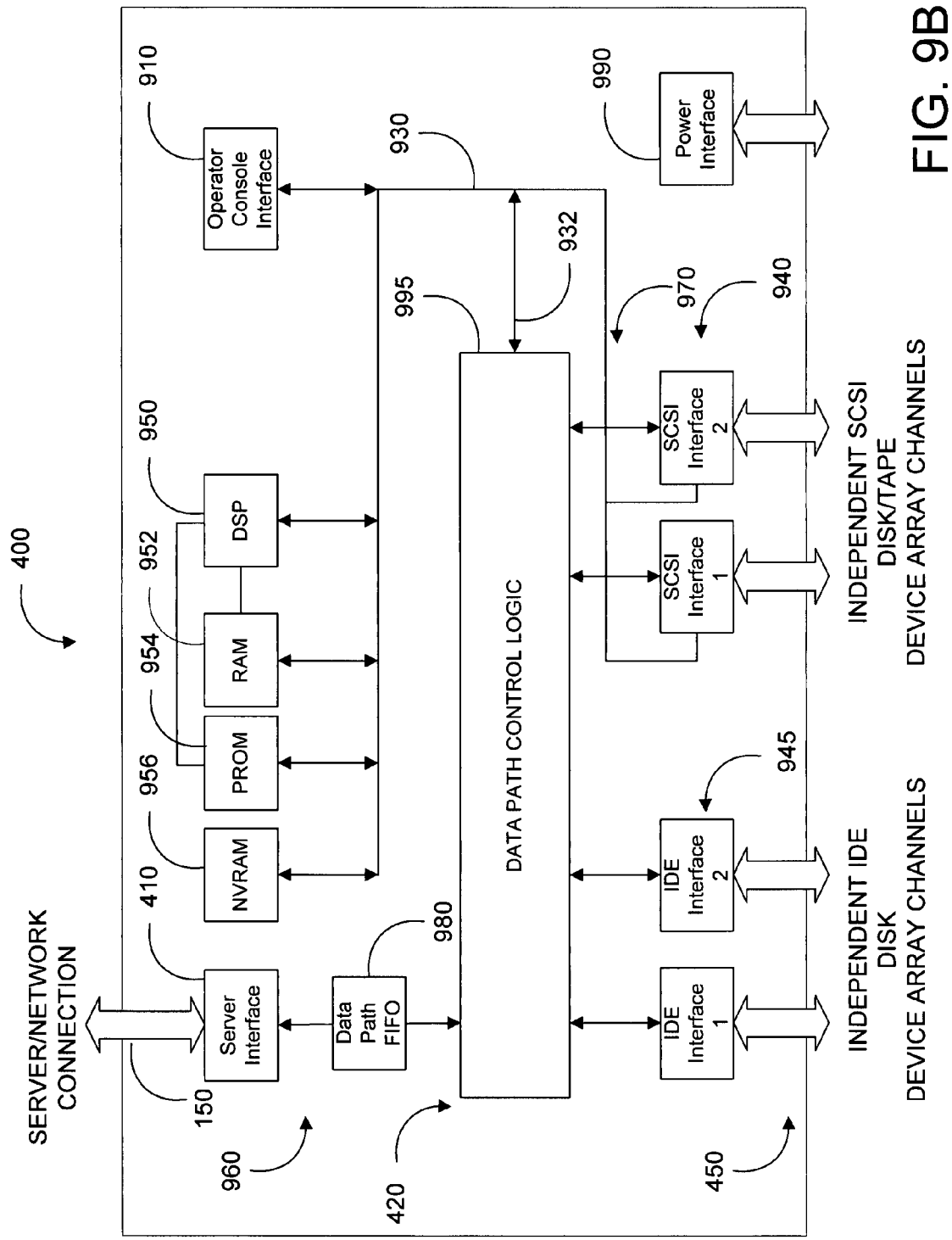

FIGS. 9A-B illustrate virtual tape controller (VTC) 400 embodiments having a server interface 410, a data path first-in-first-out (FIFO) 980 and a data path control 420. The server interface 410 provides a communications channel 150 to a server 110 (FIG. 4), as described above. A data communication channel 960 provides an internal data bus between the server interface 410, the data path FIFO 980 and the data path control 420. The data path FIFO 980 provides an overlapping data buffer between the server interface 410 and the data path control 420. The data path control 420 provides internal data communication channels 970 to an array of device channel interfaces 940 (FIGS. 9A-B), 945 (FIG. 9B). Each device channel interface 940 (FIGS. 9A-B), 945 (FIG. 9B) provides a communications channel 450 to the storage media 460 (FIG. 4), also as described above. The VTC 400 also has an operator console interface 910, an enclosure management interface 920 (FIG. 9A), and a power interface 990. The operator console interface 910 controls a character display (not shown) and push button switches (not shown) that allow for manual configuration setup as well as for initiating and monitoring off-line and diagnostic utilities. The enclosure management interface 920 (FIG. 9A) monitors power supplies, cooling fans, a door interlock and controls enclosure LED indicators. The power interface 990 provides a connector for input DC power for the VTC electronics and the enclosure LEDs.

As shown in FIGS. 9A-B, the VTC 400 embodiments also have a digital signal processor (DSP) 950, microprocessor random access memory (RAM) 952, programmable read only memory (PROM) 954, non-volatile random access memory (NVRAM) 956, microprocessor data bus 930, data path command logic 932, and data path control logic 1000. The PROM 954 contains the VTC firmware as read only DSP instructions, described with respect to FIGS. 11A-B, below. The RAM 952 contains program parameters and variables. In one embodiment, the PROM 954 is an EEPROM and updated firmware can be downloaded into the PROM 954 from the server channel 150. The NVRAM 956 contains VTC configuration and status information. The microprocessor data bus 930 is also used to send a data path command 932, service the operator console and enclosure management interface and control the associated RAM 952, PROM 954 and NVRAM 956. The DSP 950 utilizes the microprocessor data bus 930 to program the channel interfaces 940 to send a command and receive the status of the command from the storage media 460 (FIG. 4). The data path command 932 instructs the data path control logic 1000 to program the data routing to and from the storage devices to transfer the command and associated data over the data path 970.

As shown in FIG. 9A, in one VTC embodiment 400, the device array channels 450 each support either disk or tape storage devices. The channel interfaces 940 provide drivers/receivers for the data path communications channel 450. The channel interfaces 940 are low voltage differential/single-ended (LVD/SE) devices supporting multi-mode LVD or SE operation for SCSI storage devices.

As shown in FIG. 9B, in an alternative VTC embodiment 400, the device array channels 450 are partitioned between those supporting both disk and tape storage devices and those supporting only disk storage devices. In particular, the channel interfaces 940 are low voltage differential/single-ended (LVD/SE) devices supporting multi-mode LVD or SE operation for SCSI storage devices, which can be either disk or tape. The channel interfaces 945 support IDE disk storage devices only. One data path control logic embodiment 995 functions to provide a single or dual IDE control data path and a single or dual SCSI control data path. The DSP controls the data control path logic 995 using the microprocessor data bus 930 and sends a data path command 932 to set the operating mode.

In one embodiment, a single VTC 400 operates to control disk storage and tape storage. In another embodiment, multiple VTCs 400 advantageously share disk storage and tape storage. Further, a VTC 400 allows scalable disk storage configurations. In one embodiment, the VTC 400 supports between one and five disks or RAID devices in a single rank utilizing the array channels 940. Further, multiple ranks of storage devices may be attached to each channel 940. As such, the VTC 400 supports various striping configurations, including RAID Level 0 and RAID Level 3 operations for data redundancy and/or increased data transfer performance.

Figure 10:
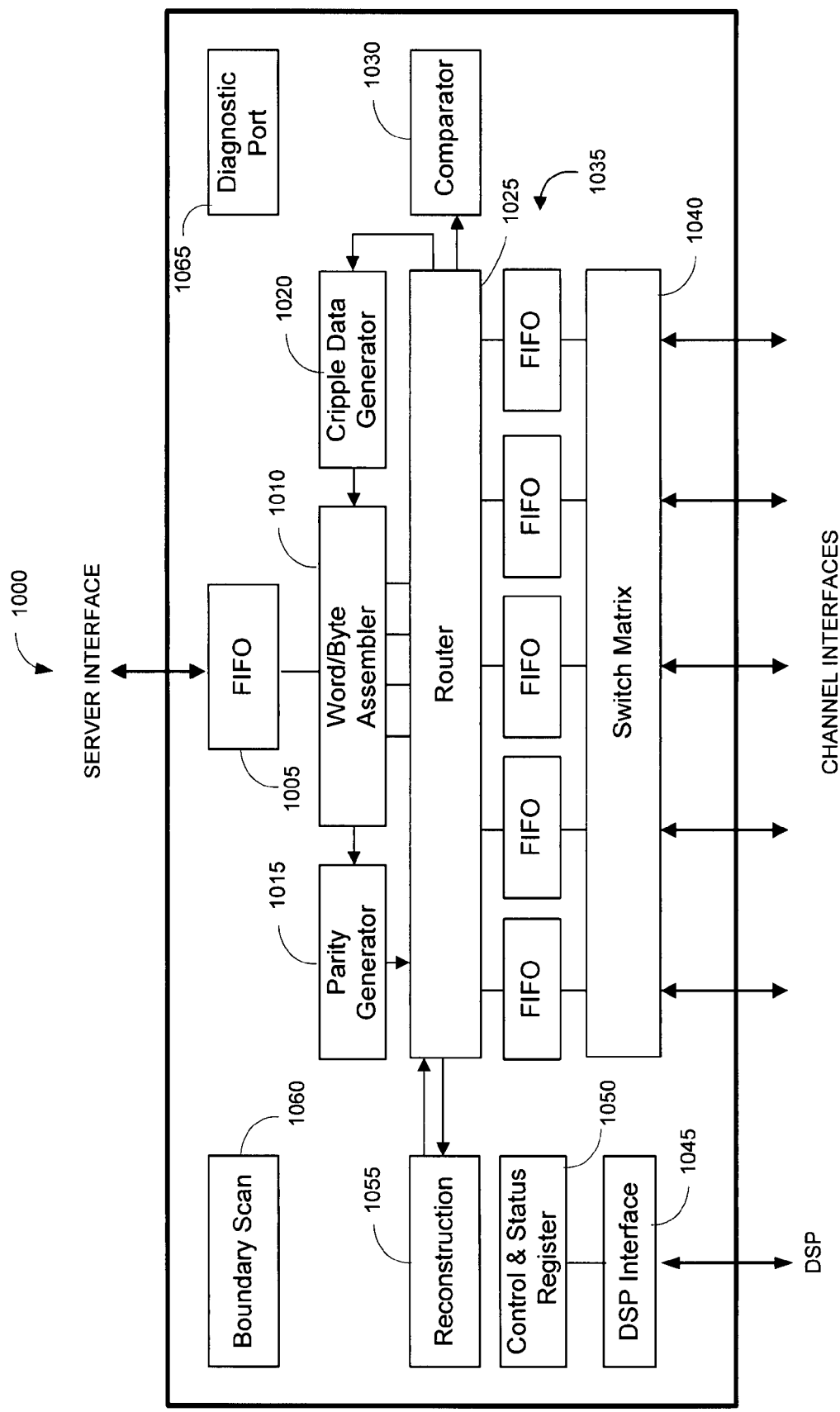
FIG. 10 is a block diagram of a data path control logic embodiment for a virtual tape controller.

FIG. 10 illustrates another, more elaborate data path control logic embodiment 1000 having FIFOs 1005, 1035, a word/byte assembler 1010, a parity generator 1015, a cripple data generator 1020, a router 1025, a comparator 1030, a switch matrix 1040, a DSP interface 1045, a control & status register 1050, a reconstruction 1055, a boundary scan 1060 and a diagnostic port 1065. The data path control logic 1000 has several functions, including routing data bytes/words from a server 110 (FIG. 4) to target channels 450 (FIG. 4) in a "pass thru", "mirroring", "striping" or a combination of "mirroring" and "striping" manner; switching data on any or all of the target channels 450 (FIG. 4); generating parity and parity checking; reproducing data for a channel that is being reconstructed and generating pass thru, mirroring, and striping (2+0, 2+1, 2+2, 4+0, 4+1); and providing all of the logic to handle server and target DMA (Direct Memory Access) sequences.

As shown in FIG. 10, the FIFOs 1005, 1035 provide a flexible "gasket" to accommodate data exchange between the VTC 400 (FIG. 9A) and outside data streams. The word/byte assembler 1010 assembles the incoming data from the server for the proper channels. The parity generator 1015 generates parity bytes/words for the proper channel. The cripple data generator 1020 generates the data that was lost from a specific channel. The router 1025 routes the incoming data from a server to different output registers. The comparator 1030 compares the "XOR" of 4 or 2 channels to the data from a parity channel. The switch matrix 1040 exchanges data from internal output registers to different output channels. The DSP interface 1045 handles all of the read/write logic between the outside DSP 950 (FIG. 9A) and the data control path logic 1000. The control and status registers 1050 configure different operating modes of the data control path logic 1000. Reconstruction 1055 generates lost data of a channel from an existing set of data. Boundary scan 1060 is used for testability and manufacturing of a data control path logic chip. The diagnostic port 1065 probes into internal registers and states of a data control path logic chip. In one embodiment, the data path control logic 1000 is implemented as a field programmable gate array (FPGA).

Virtual Tape Controller Firmware

Figure 11A:
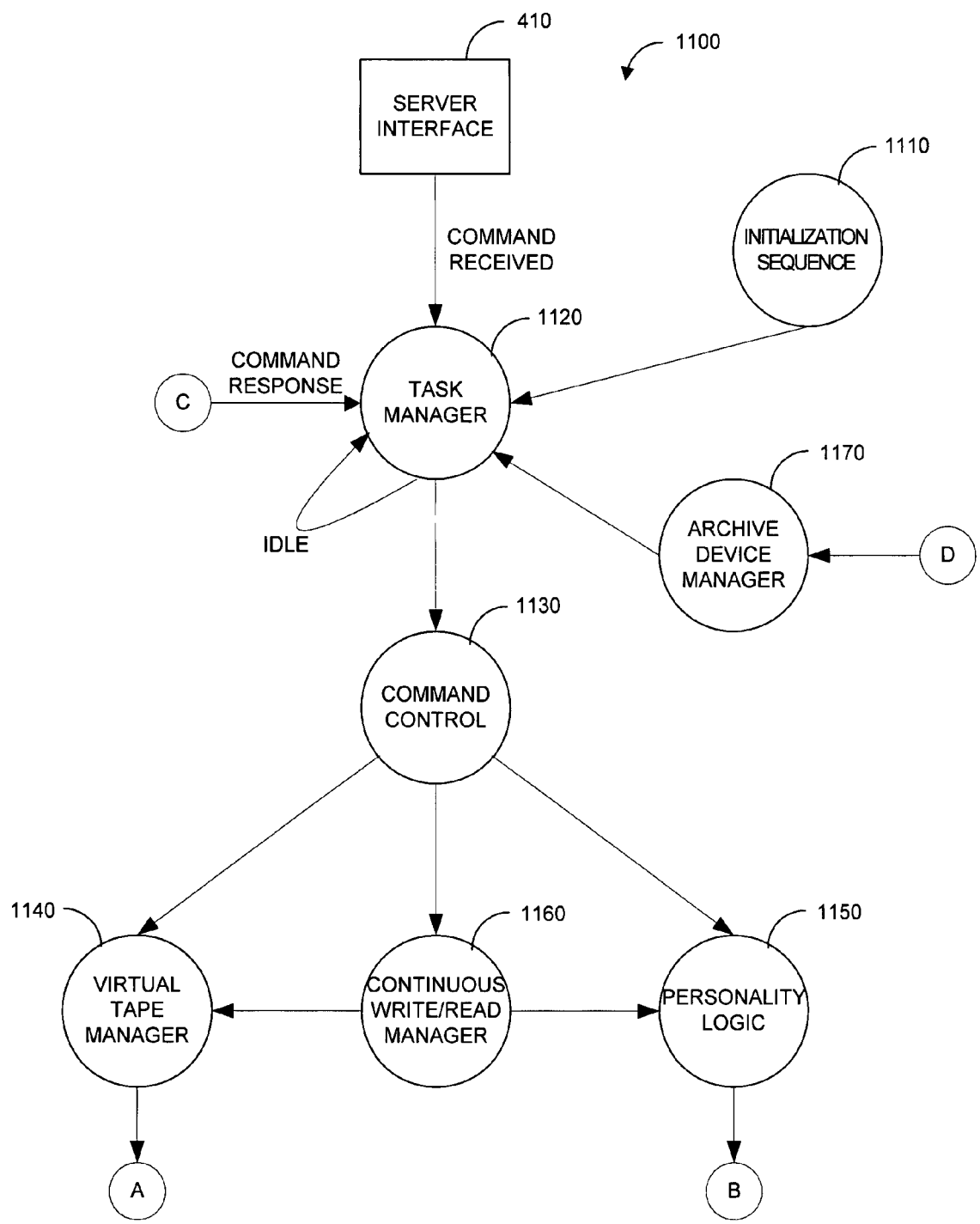
FIGS. 11A-B are a top level controller flow diagram.
Figure 11B:
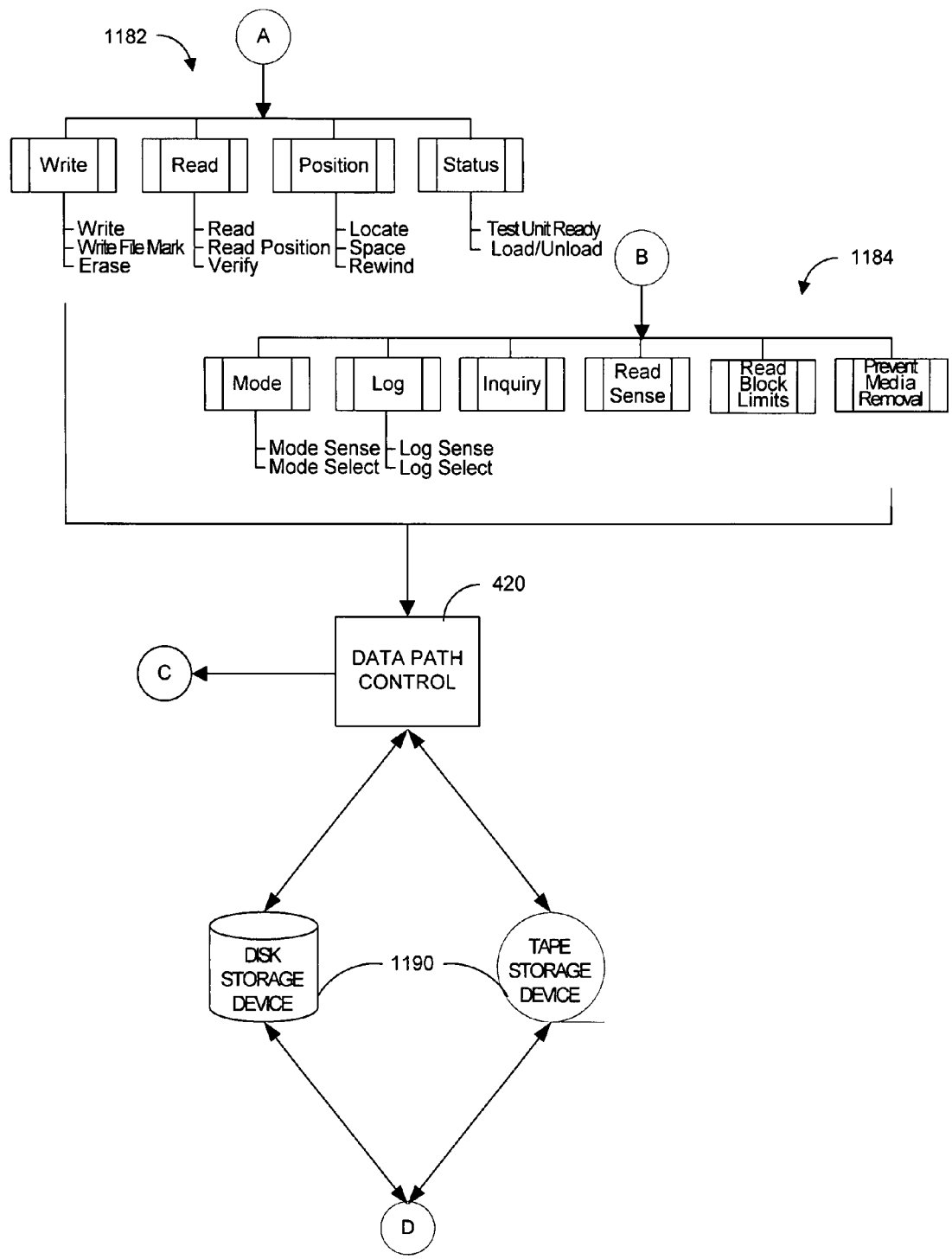

FIGS. 11A-B illustrates controller firmware 1100 for a virtual tape controller 400 (FIG. 4). As shown in FIG. 11A, the controller firmware 1100 has an initialization sequence, 1110, a task manager 1120, a command control 1130, a virtual tape manager 1140, personality logic 1150, a continuous write/read manager 1160 and an archival device manager 1170. The initialization sequence 1110 initializes the virtual tape system operational state. In particular, the initialization sequence 1110 validates the virtual tape system configuration, spins-up all attached disk storage devices, loads the virtual tape system look-up tables 600 (FIG. 6) and sets the request sense data buffer to report a "unit attention—first access, power on reset has occurred" error condition with the request sense data buffer flag set to a valid state. Also, the initialization sequence 1110 initializes parameters for a virtual tape volume if one is currently mounted, such as described below with respect to the virtual tape manager 1140 (FIG. 11A). Further, the initialization sequence 1110 auto discovers archival tape storage devices and captures the response data for the common commands shown in TABLE 1. In addition the initialization sequence 1110 auto discovers archival media changers/robot devices and captures the response data for the common commands shown in TABLE 2. The tape storage device response for the commands shown in TABLE 1 and 2 are also built-in to the VTC 400 (FIG. 4) for a specific tape storage device emulation, so that the controller can operate without a tape storage device attached.

TABLE 1

Tape Storage Device Response Data

| COMMAND | RESPONSE DATA |
|---|---|
| Inquiry | |
| Mode Sense (Page 00h) | Block Descriptor |
| Mode Sense (Page 10h) | Device Configuration Page |
| Mode Sense (Page 0Fh) | Data Compression Characteristics Page |
| Mode Sense (Page 11h) | Medium Partitions Parameter Page |
| Mode Sense (Page 31h) | AIT Device Configuration Page |
| Mode Sense (Page 3Fh) | All Pages |
| Read Block Limits | Block Length Limits |
| Log Sense (Page 00h) | All Pages |
| Log Sense (Page 02h) | Write Counters |
| Log Sense (Page 03h) | Read Counters |
| Log Sense (Page 2Ah) | TapeAlert Page |

TABLE 2

Media Changer/Robot Device Response Data

| COMMAND | RESPONSE DATA |
|---|---|
| Inquiry | |
| Mode Sense (Page 1Ch) | TapeAlert page |
| Mode Sense (Page 1Dh) | Element Address Assignment page |
| Mode Sense (Page 1Eh) | Transport Geometry Descriptor page |
| Mode Sense (Page 1Fh) | Device Capabilities page |

The task manager 1120 is event driven, idling until receiving a command from the server interface 410, receiving a command response from storage devices 1190 via data path control 420, or receiving a service request from the initialization sequence 1110, archive device manager 1170 or other modules described below.

Also shown in FIG. 11A, the command control 1130 identifies the command received, performs command pre-execution logic and then calls the virtual tape manager 1140 or the personality logic 1150 to process the command. The command pre-execution logic makes sure the command is valid. Otherwise, the command is terminated with a check condition status with a request sense data buffer constructed to report an illegal request error condition, and the request sense data buffer flag is set to a valid state. If the request sense data buffer is set to report a unit attention condition, the next command received will terminate with a check condition status except for the inquiry command and the request sense command. The inquiry command is always processed without clearing a pending unit attention condition, whereas all other commands will clear the sense data buffer and make it invalid. The virtual tape manager 1140 handles media access commands and controls the operational state of a virtual tape device. The virtual tape manager 1140 uses a volume management look-up table 601 (FIG. 6) to control the virtual tape device loaded/unloaded status and to determine which virtual tape volume is currently mounted. The virtual tape manager 1140 uses a data management look-up table 602 (FIG. 6) to control how commands are handled based on the current tape block position and the current sequential tape data format.

The virtual tape manager 1140 initializes various operational state parameters when a virtual tape volume is first loaded, using information in the data management look-up table 602 (FIG. 6). A TapeBlockPosition parameter is set to zero. A DiskLogicalBlockAddress parameter is set to the starting sector for the active virtual tape volume. A TapeBlockSize parameter is set for the virtual tape volume at position zero. A NextFileMark parameter is set to the tape block position of the first file mark. If no file marks are present, the NextFileMark parameter is set to zero. A NextSetMark parameter is set to the tape block position of the first set mark. If no set marks are present, the NextSetMark parameter is set to zero. A NextBlockSize parameter is set to the tape block position of the next block size change. If no block size changes are present, a NextBlockSize parameter is set to zero. An EndOfData parameter is set to the current End-of-Data tape block position. A VTS_TapeDrive flag is set to force the first received command to get a check condition status indicating a new tape load has occurred.

Further shown in FIG. 11A, the personality logic 1150 manages non-media access commands and controls the operational characteristics of a virtual tape device. The personality logic 1150 has four operational states depending on the presence of a physical tape device including no tape storage device attached, tape storage device attached, snap shot and tape storage device removed. When no tape storage device is attached, the personality logic 1150 is responsible for all non-media access commands and may require additional commands to be added other than the ones stated in the initialization sequence. When a tape storage device is attached, personality logic 1150 captures all of the common non-media access commands during the initialization sequence. If a command is received that is not already captured, it is sent to the attached tape storage and the response is captured as a "snap shot" for future use. If a tape storage device is removed, the personality logic 1150 uses the captured command response transparently.

The virtual tape drive Inquiry data information, operational control parameters and statistic counters are virtualized using user defined configuration settings or response data captured from an attached tape storage device. The Mode Sense and Log Sense operational control parameters are transparently managed using Mode Select and Log Select commands as if the virtual tape device was a conventional tape storage device. The Read Block Limit non-media access command responds with a default maximum block limit of FFFFFFh (16777215 d) and a minimum block limit of 1 h (1 d) or the response is captured from an attached sequential tape storage device. The request sense command is used to communicate error condition information as well as the tape block position and the remaining storage capacity based on the current tape block position.

Additionally shown in FIG. 11A, when a command is received by the VTC 400 (FIG. 4), the command is first checked to see if it is a valid sequential tape storage device command. The command is then processed using the personality logic 1150 if it is a non-media access command or by the virtual tape manager 1140 if it is a media access command. If the command is invalid or an error condition results after it is processed, a request sense data buffer is constructed to report the type of error, the current tape block position and the remaining tape storage capacity and a flag is set to indicate the request sense data buffer is valid.

If a command is received that is not built-in or has not been previously processed, the VTC 400 (FIG. 4) will pass the command on to an attached tape storage device 350 (FIG. 4) for the appropriate response. The response will be captured and saved for future use. If no tape storage device is attached, the VTC 400 (FIG. 4) responds to the command with a check condition and request sense data indicating the command is unsupported. Support for this command can be easily added to the list of built-in commands or a tape drive can be attached temporarily to get a snap-shot of the appropriate response.

As shown in FIG. 11B, the virtual tape manager 1140 in executing media commands 1182 communicates with storage devices 1190 via the data path control 420. Also, the storage devices 1190 communicate a command response to the task manager 1120 via the data path control 420. The archival device manager 1170 manages tape storage devices 1190.

Not shown in FIG. 11A, the task manager 1120 also services management routines including media management, local operator console, remote management API and enclosure management modules. Media management emulates a virtual tape library storage device to provide a method to manage virtual tape volumes using a virtual media changer or robot device. The local operator console provides local configuration and volume management. The remote management API provides remote configuration and volume management. Enclosure management monitors enclosure fan, power, and security resources.

Media Access Commands

Figure 12A:
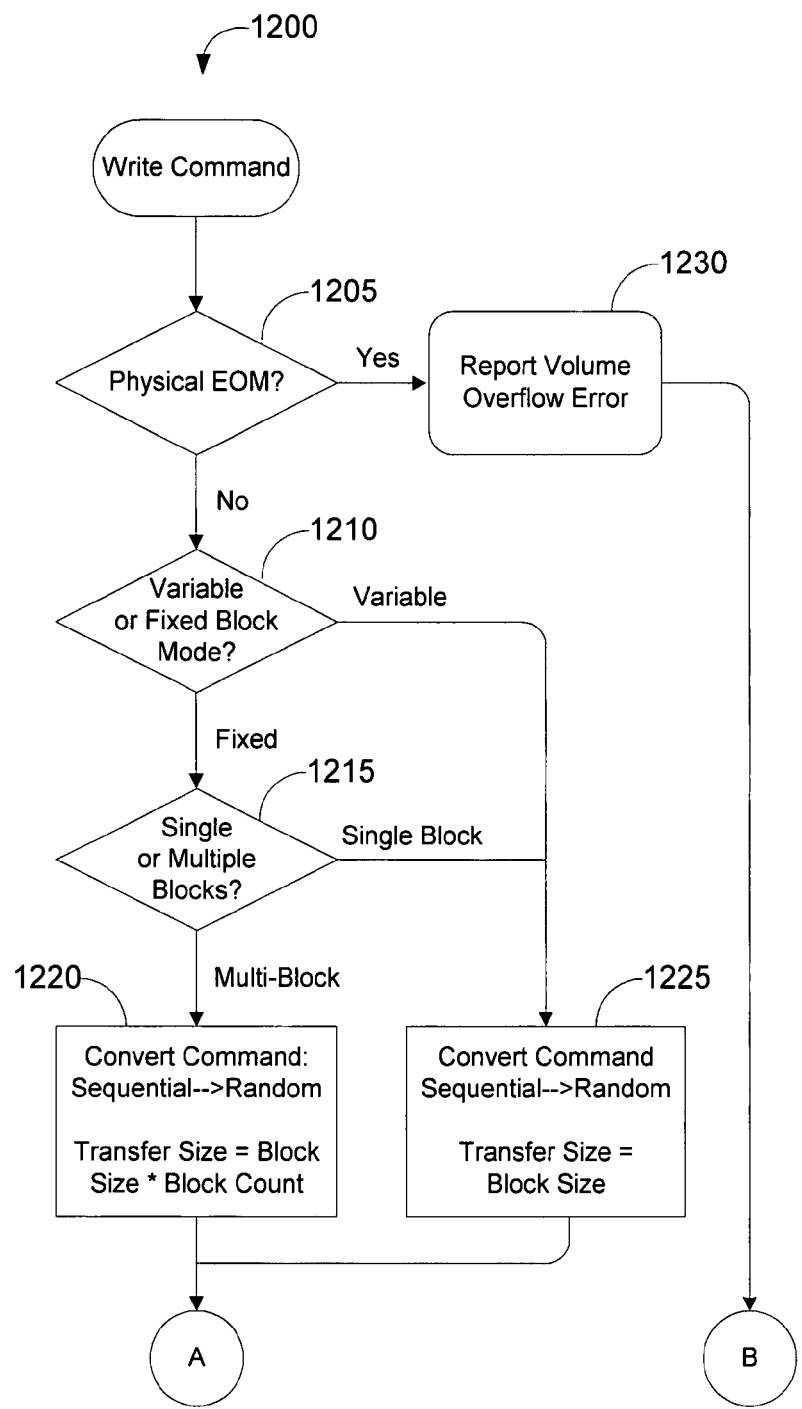
FIGS. 12-23 are detailed flow diagrams for various media commands.
Figure 12B:
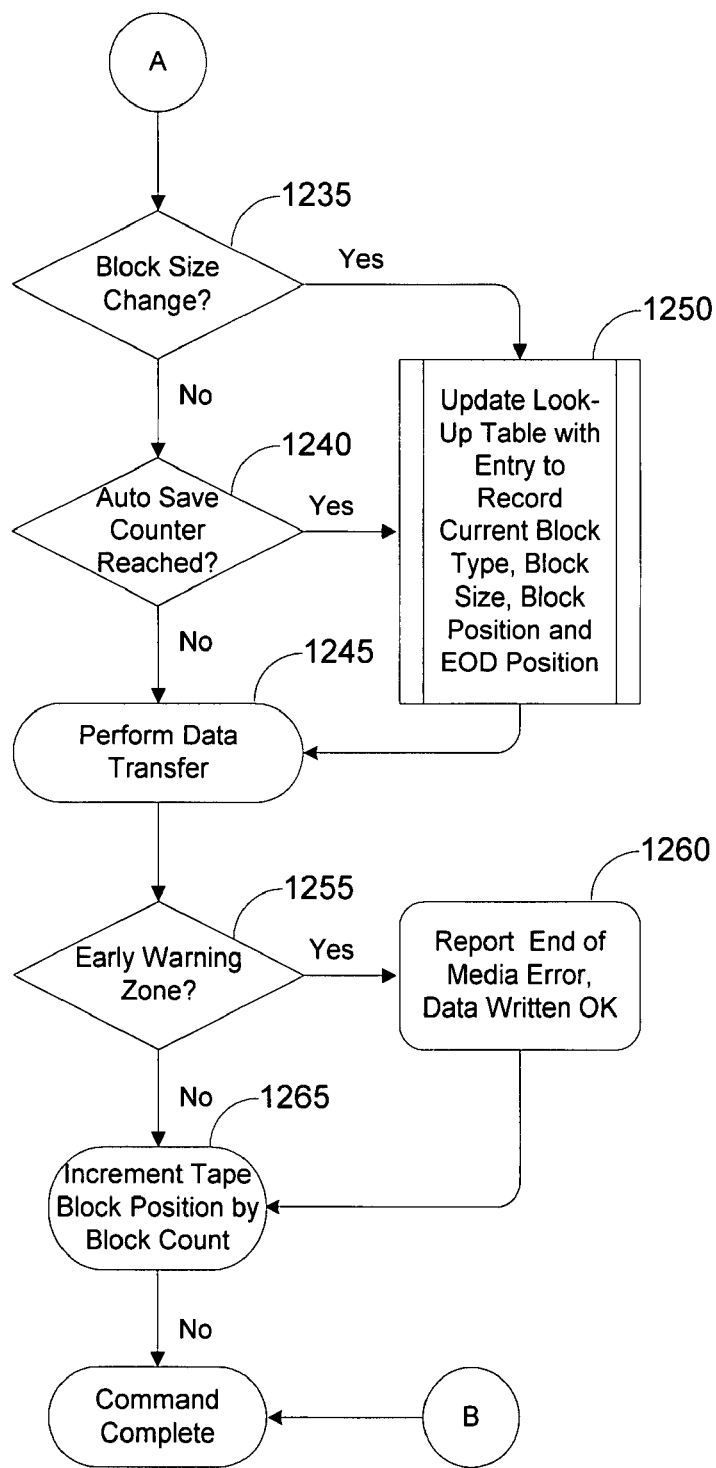
Figure 13:
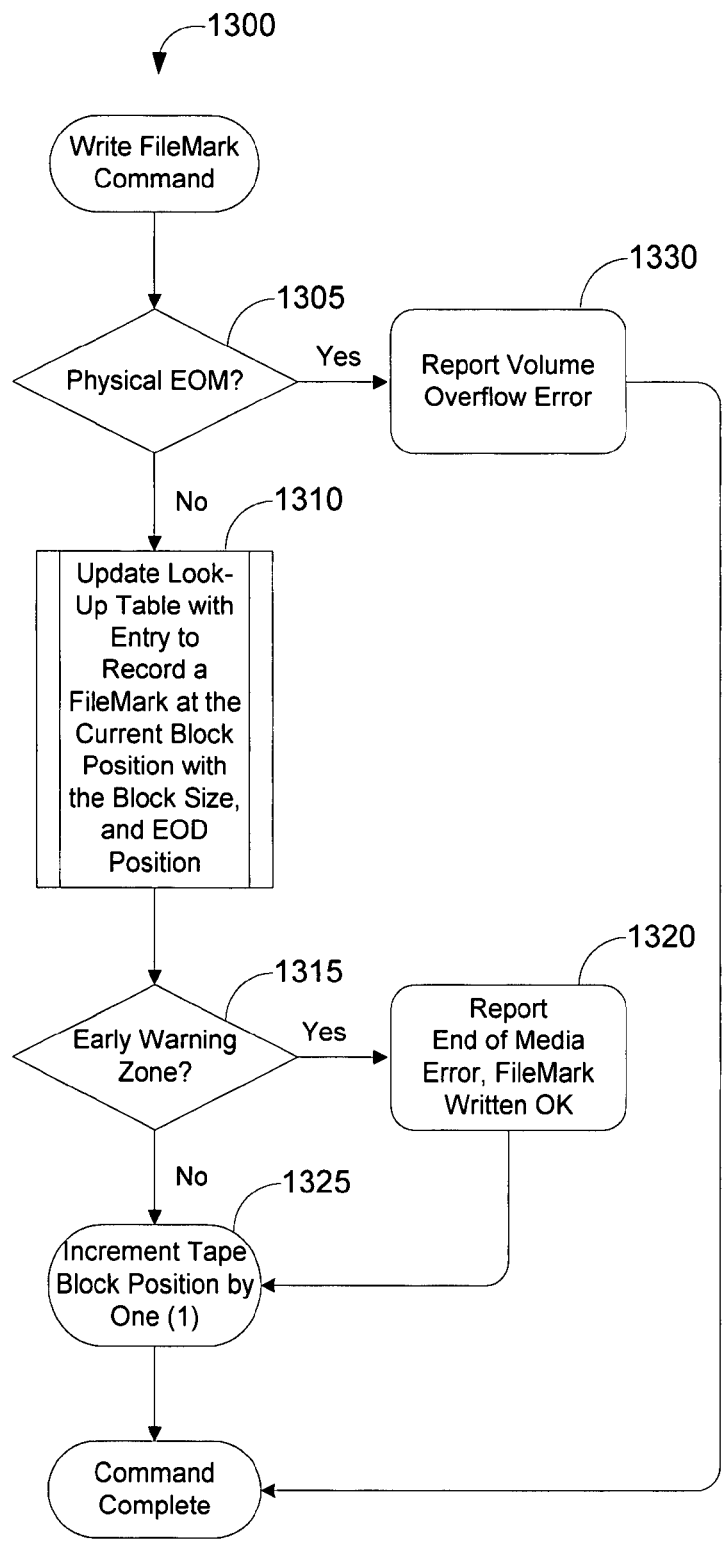
Figure 14:
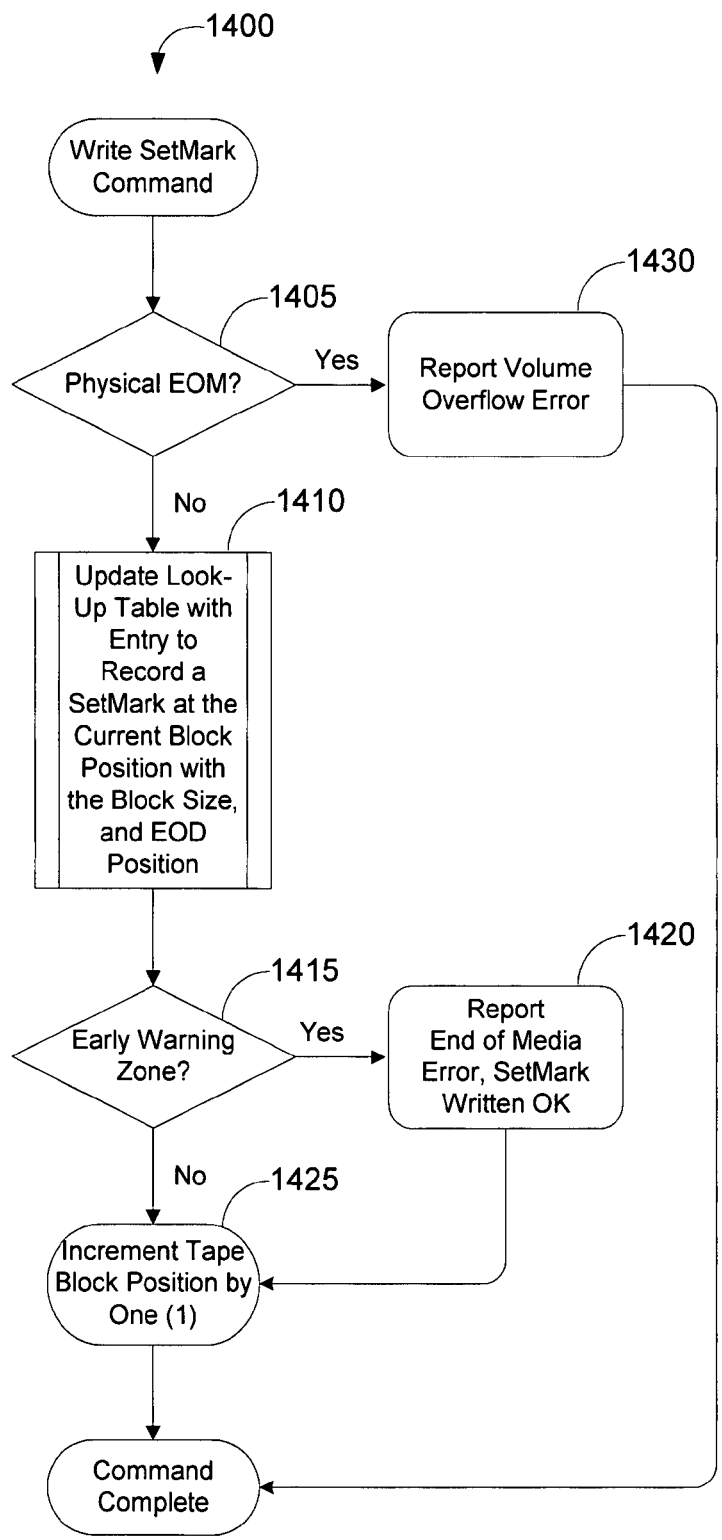

FIGS. 12-14 illustrate the write commands Write, Write FileMark and Write SetMark, respectively. Each of these media access commands cause an event to be recorded in a data management look-up table 601 (FIG. 6), including one or more of a block attribute 662 (FIG. 6), block size 664 (FIG. 6), and block position 668 (FIG. 6). When tape blocks are written, an entry is also added to the data management look-up table 601 (FIG. 6) when the current tape block position is zero or when a tape block size is changed. Any time a write operation takes place, an EndOfData parameter changes. Hence, the current value is saved in the table descriptor 650 (FIG. 6) periodically or whenever the virtual tape device is idle.

As shown in FIGS. 12A-B, a Write media access command 1200 modifies the TapeBlockSize, TapeBlockPosition and EndOfData parameters and records all changes in the data management table 602 (FIG. 6) to track changes and save the sequential tape block layout 1250. If the current tape position is at physical end-of-media (EOM) 1205, the write command is terminated with a check condition. The request sense data buffer is constructed with sense data to report a volume overflow error condition, and the request sense data buffer flag is set to a valid state. If the write command is in variable block mode 1210 or in fixed block mode as a single block 1215, the command is converted 1225 from a sequential tape command to a random access command where the transfer size is equal to the tape block size. If the write command is in fixed block mode as multiple tape blocks 1215, the command is converted 1220 from a sequential tape command to a random access command where the transfer size is equal to the calculation of the tape block size times the number of tape blocks. If the current tape block size has changed 1235 from the previous tape block size, an entry is added to the virtual tape volume lookup table to record the current block attributes, block size, block position and end-of-data (EOD) position 1250. If the auto save counter 1240 has reached a predetermined value based on number of commands processed or if the virtual tape system is idle, the current end-of-data (EOD) position is automatically recorded 1250. If the current tape position is located at the early warning zone 1255 or higher, the command is processed as normal, however, the command is terminated with a check condition and a request sense data buffer is constructed with sense data to report the end-of-media has been reached and the data was written OK 1260, and the request sense data buffer flag is set to a valid state. After the write command is processed, the TapeBlockPosition parameter is incremented by the block count value 1265 and the EndOfData parameter is set to equal the current tape block position.

As shown in FIG. 13, a Write FileMark media access command 1300 modifies the TapeBlockPosition and EndOfData parameters and updates the data management table 602 (FIG. 6) to save the current sequential tape block layout 1310. If the current tape position is at physical end-of-media (EOM) 1305, the write filemark command is terminated with a check condition. The request sense data buffer is constructed with sense data to report a volume overflow error condition, and the request sense data buffer flag is set to a valid state. If the current tape position is located at the early warning zone 1315 or higher, the command is processed as normal. However, the command is terminated with a check condition and a request sense data buffer is constructed with sense data to report the end-of-media has been reached and the filemark was written OK 1320, and the request sense data buffer flag is set to a valid state. After the write filemark command is processed, the TapeBlockPosition parameter is incremented by the block count value 1325 and the EndOfData parameter is set to equal the current tape block position.

As shown in FIG. 14, a Write SetMark media access command 1400 modifies the TapeBlockPosition and EndOfData parameters and updates the data management table 602 (FIG. 6) to save the current sequential tape block layout 1410. If the current tape position is at physical end-of-media (EOM) 1405, the write setmark command is terminated with a check condition. The request sense data buffer is constructed with sense data to report a volume overflow error condition, and the request sense data buffer flag is set to a valid state. If the current tape position is located at the early warning zone 1415 or higher, the command is processed as normal. However, the command is terminated with a check condition and a request sense data buffer is constructed with sense data to report the end-of-media has been reached and the setmark was written OK 1420, and the request sense data buffer flag is set to a valid state. After the write setmark command is processed, the TapeBlockPosition parameter is incremented by the block count value 1425 and the EndOfData parameter is set to equal the current tape block position.

Figure 15:
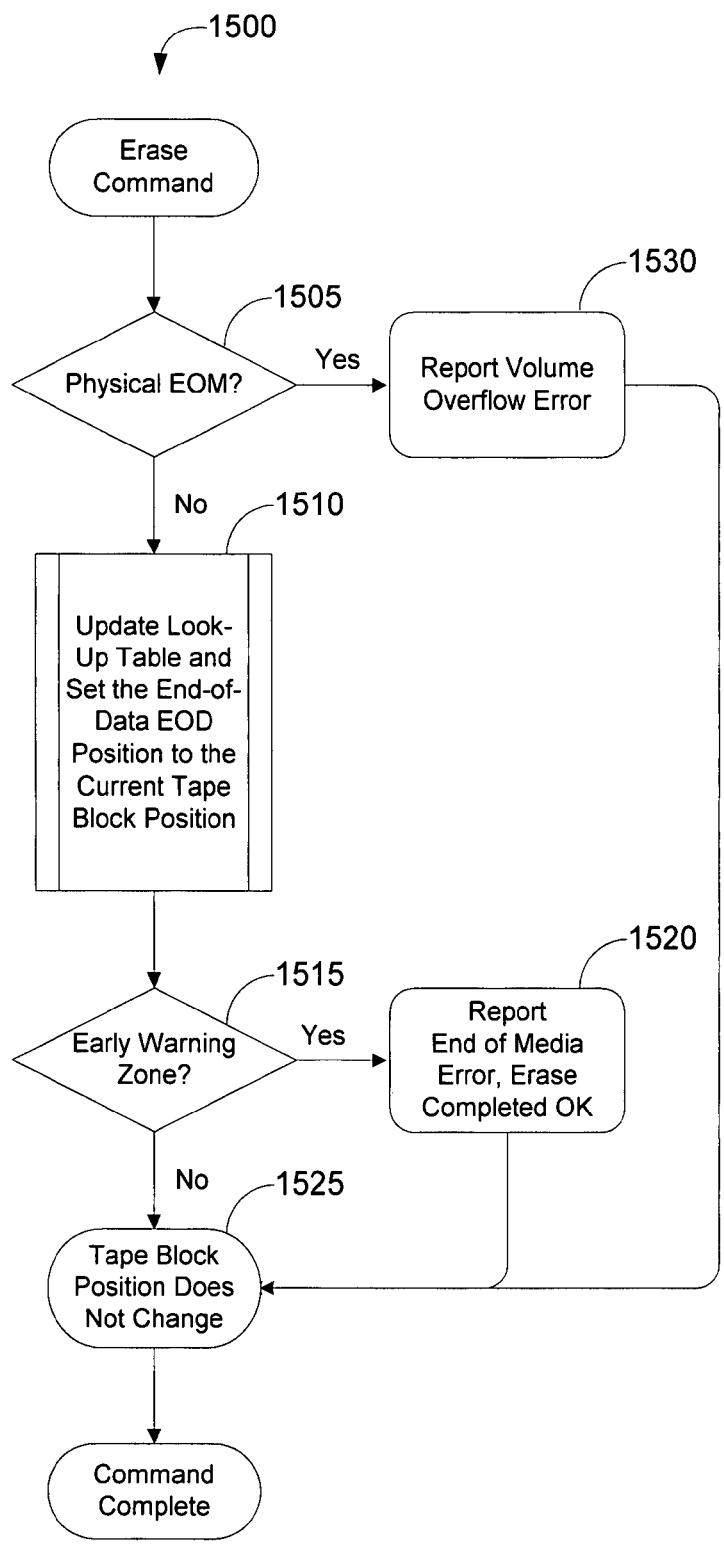

FIG. 15 illustrates the Erase media access command 1500, which modifies the TapeBlockPosition and EndOfData parameters and updates the data management table 602 (FIG. 6) to save the current sequential tape block layout 1510. If the current tape position is at physical end-of-media (EOM) 1505, the erase command is terminated with a check condition and a request sense data buffer is constructed with sense data to report a volume overflow error condition, and the request sense data buffer flag is set to a valid state. If the current tape position is located at the early warning zone 1515 or higher, the command is processed as normal. However, the command is terminated with a check condition. The request sense data buffer is constructed with sense data to report the end-of-media has been reached and the erase command was processed OK 1520, and the request sense data buffer flag is set to a valid state. After the erase command is processed, the EndOfData parameter is set to equal the current tape block position 1525, and any virtual tape volume lookup table events beyond the current tape block position are erased. If the "long erase" option is selected in the command, the associated virtual tape volume data is erased between the current tape block position and the physical end-of-media tape block position.

Figure 16A:
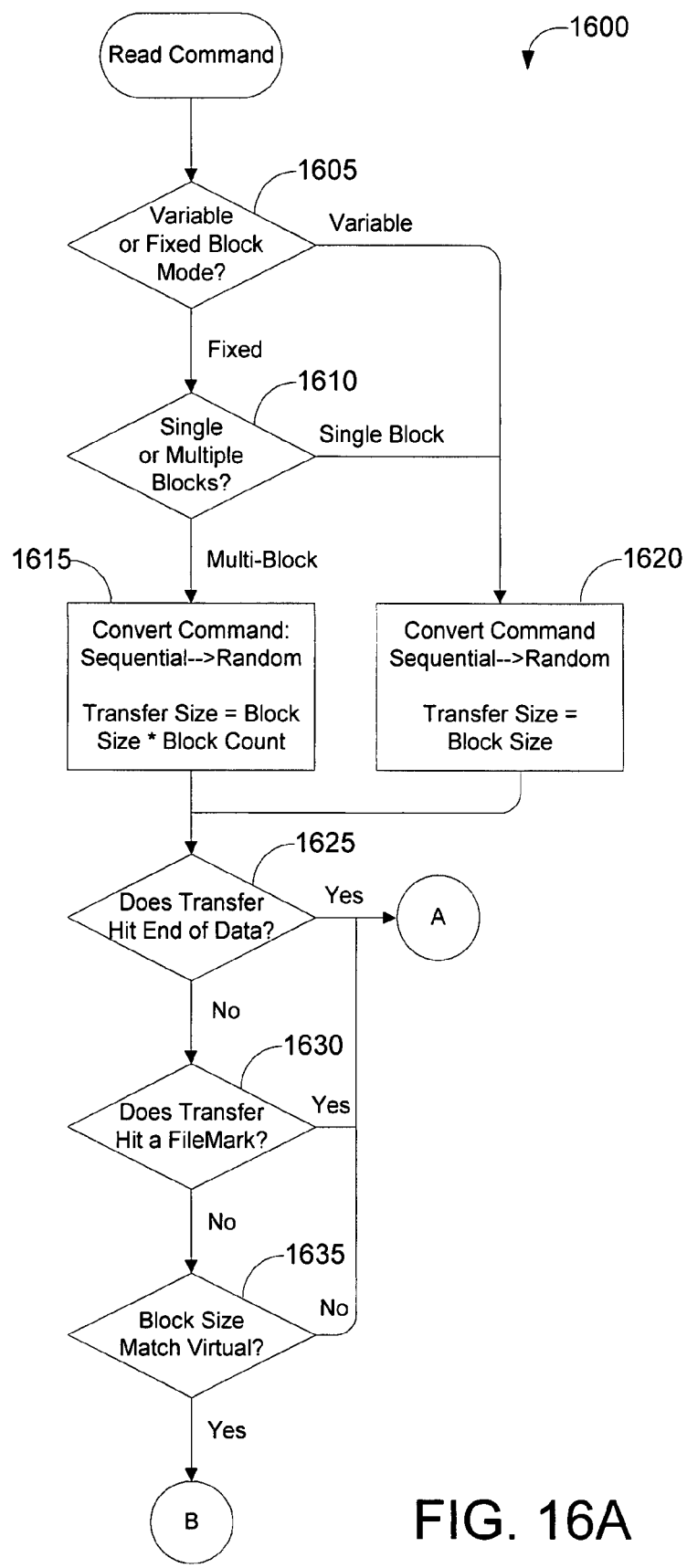
Figure 16B:
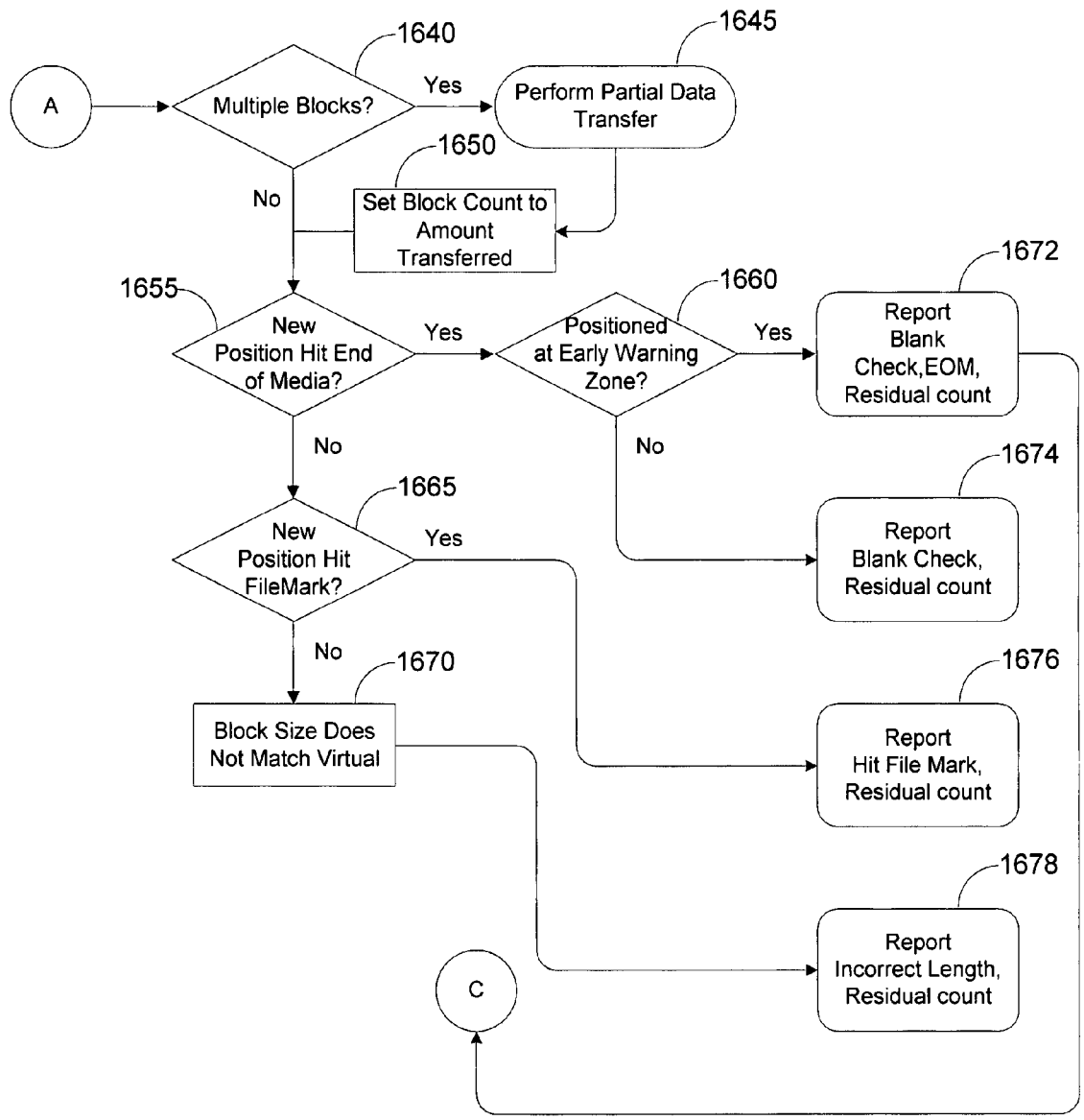
Figure 16C:
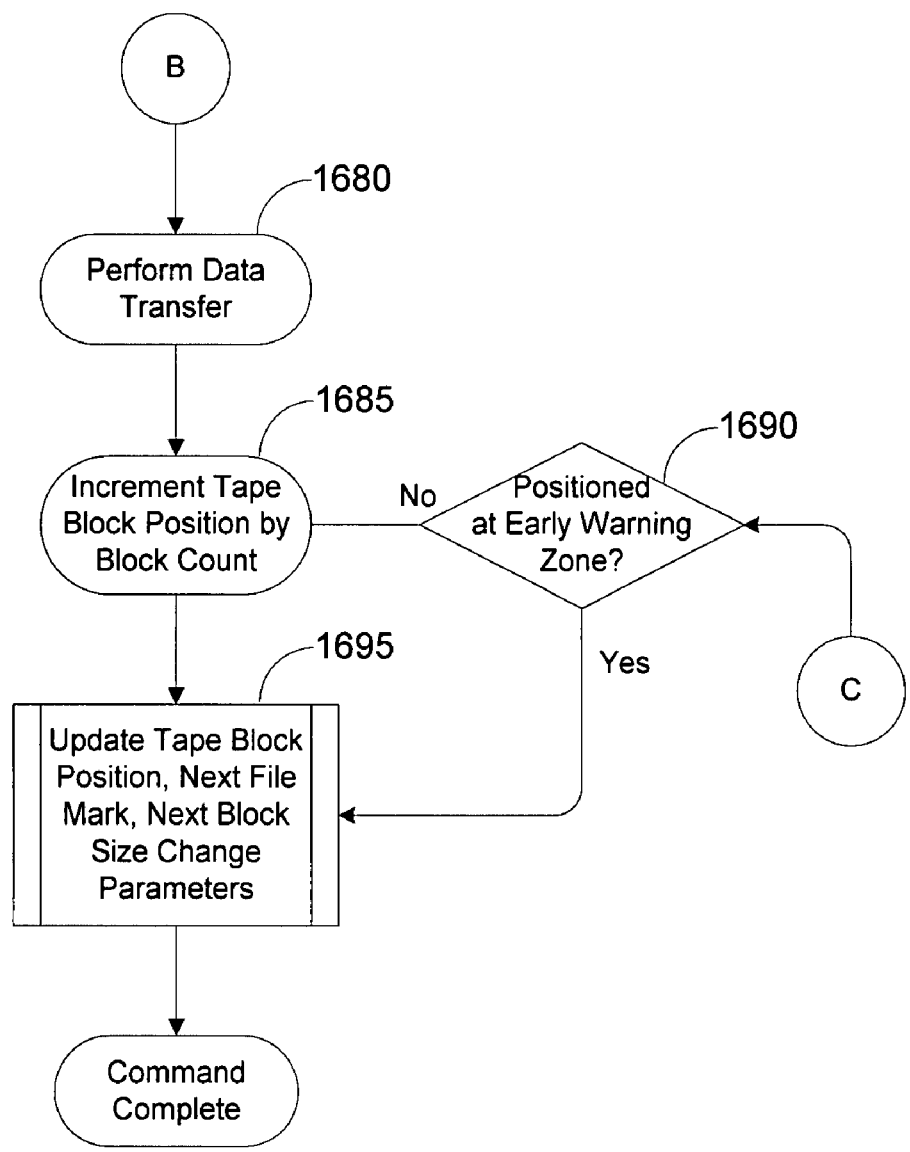

FIGS. 16A-C illustrate the Read media access command, which uses the TapeBlockSize, TapeBlockPosition, NextFileMark, NextSetMark, NextBlockSize and EndOfData parameters in a data management table 602 (FIG. 6) to determine how the Read command should be processed. If the read command is in variable block mode 1605 or in fixed block mode as a single block 1610, the command is converted 1620 from a sequential tape command to a random access command where the transfer size is equal to the tape block size. If the read command is in fixed block mode as multiple tape blocks 1610, the command is converted 1615 from a sequential tape command to a random access command where the transfer size is equal to the calculation of the tape block size times the number of tape blocks. If the tape block position is at end-of-data (EOD) 1625, the read command does not transfer any data and it is terminated with a check condition. The request sense data buffer is constructed with sense data to report a blank check end-of-data (EOD) error condition 1674; report the EOM flag if the tape is positioned at the early-warning-zone 1672; and set the request sense data buffer flag to a valid state. If the tape block position is at a filemark position 1630 (or a setmark), the read command does not transfer any data and it is terminated with a check condition. The request sense data buffer is constructed with sense data to report a filemark (or a setmark) has been reached as an error condition 1676, and the request sense data buffer flag is set to a valid state. If the read command tape block size does not match the current virtual tape block size 1635, the read command transfers data up to the current virtual tape block size and is terminated with a check condition. The request sense data buffer is constructed with sense data to report a incorrect length error condition 1678 with the calculated residual count for blocks that were not transferred. After the read command transfers the requested tape data blocks 1680, the TapeBlockPosition parameter is incremented by the block count value 1685 and the NextFileMark, NextSetMark and NextBlockSize parameters are updated 1695. The Verify media access command is processed in the same way as the read media access command described above with the exception that no tape blocks are transferred.

Figure 17:
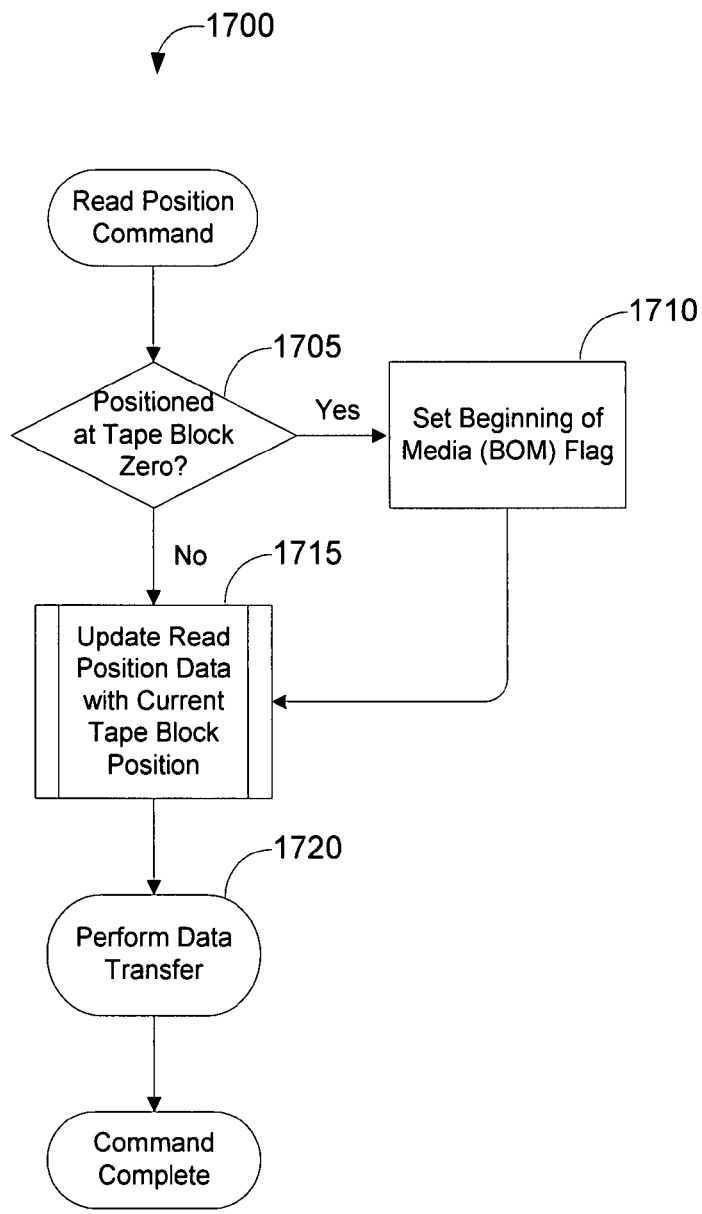

FIG. 17 illustrates the Read Position media access command 1700. If the current tape block position is at tape block zero 1705, the beginning-of-media (BOM) flag 1710 is set in the read position response data. The read position data is updated to report the current value of the TapeBlockPosition parameter 1715. After the read position data is updated, it is transferred 1720 to the server to complete the command.

FIGS. 18-21 illustrate Locate, Space and Rewind commands. The Locate media access command uses the TapeBlockPosition and the EndOfData parameters in a data management table 602 (FIG. 6) to determine if the Locate command is valid. The Space media access command uses the data management table 602 (FIG. 6) and the current TapeBlockPosition parameter to determine how the Space command should be processed. The Rewind media access command uses the data management table 602 (FIG. 6) to set the DiskLogicalBlockAddress to the starting sector of the virtual tape volume and then sets the TapeBlockPosition parameter to zero.

Figure 18:
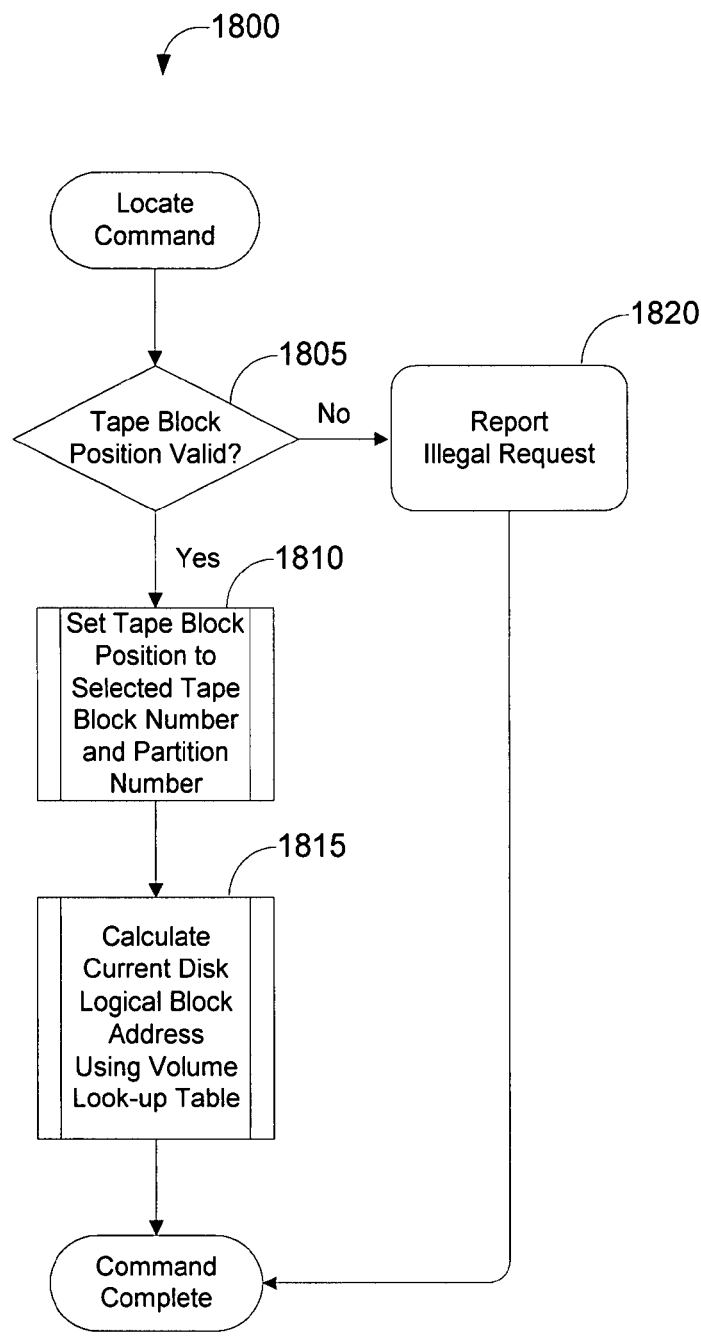

As shown in FIG. 18, a Locate media access command 1800 updates the TapeBlockPosition, DiskLogicalBlockAddress and ActivePartition parameters. If the requested tape block position is not valid 1805, the locate command is terminated with a check condition. The request sense data buffer is constructed with sense data to report an illegal request error condition 1820 and set the request sense data buffer flag to a valid state. If the requested tape block position is valid 1805 and less than or equal to the end-of-data (EOD) tape block position, the TapeBlockPosition parameter is set to the requested tape block position 1810. The current DiskLogicalBlockAddress parameter is calculated using the virtual tape volume lookup table 1815.

Figure 19:
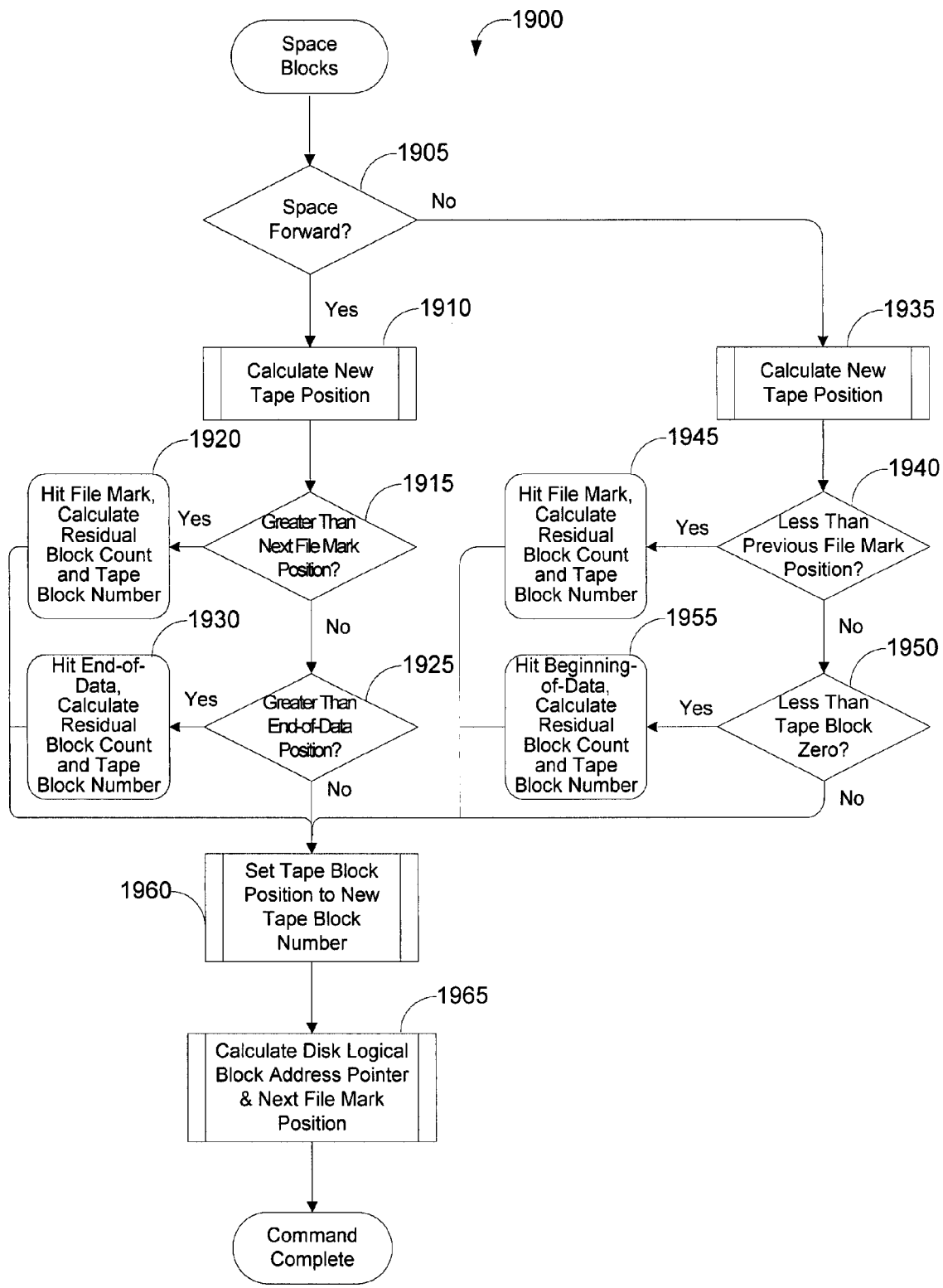

As shown in FIG. 19, a Space Blocks media access command 1900 updates the TapeBlockPosition and DiskLogicalBlockAddress parameters. If the requested space block command completes without hitting a filemark, beginning-of-media or end-of-media tape block position, the TapeBlockPosition parameter is set to the new tape block position 1960. The current DiskLogicalBlockAddress parameter is calculated using the virtual tape volume lookup table 1965. If the space block command hits a setmark or a filemark 1915, 1940, beginning-of-media 1950 or end-of-media 1925 tape block position, the resulting tape block position is calculated using the virtual tape volume lookup table. If the Report Set Mark (RSmk) bit is set to zero (default) on Mode Sense Page 10 h, space operations skip over setmarks. Otherwise, space blocks or file marks will stop at each setmark tape block position.

Figure 20:
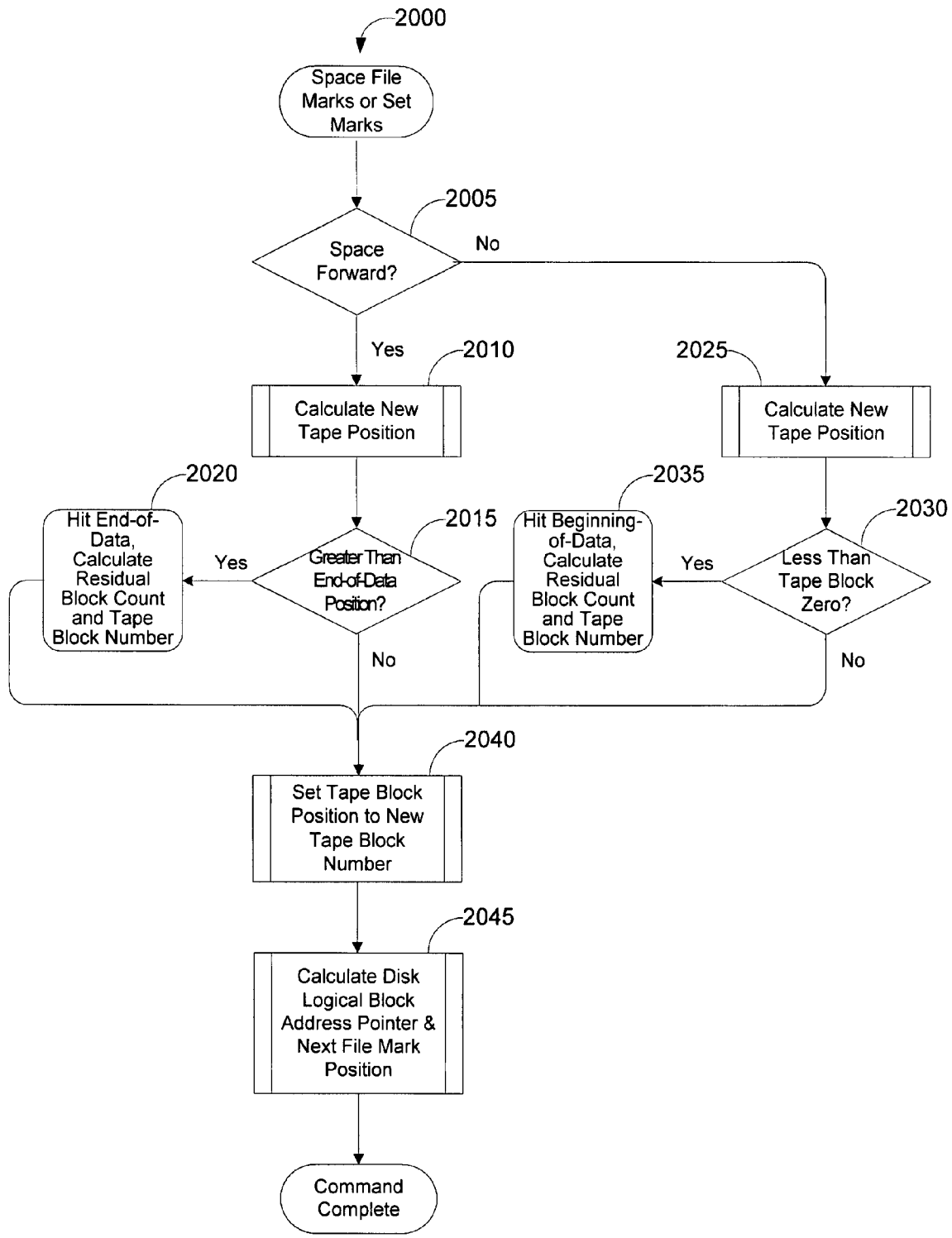

As shown in FIG. 20, a Space FileMarks or Space SetMarks media access command 2000 updates the TapeBlockPosition and DiskLogicalBlockAddress parameters. If the requested space filemark or space setmarks command completes without hitting beginning-of-media or end-of-media tape block position, the TapeBlockPosition parameter is set to the new tape block position 2040. The current DiskLogicalBlockAddress parameter is calculated using the virtual tape volume lookup table 2045. If the space command hits a beginning-of-media 2035 or end-of-media 2020 tape block position, the resulting tape block position is set to zero or EndOfData, respectively.

Figure 21:
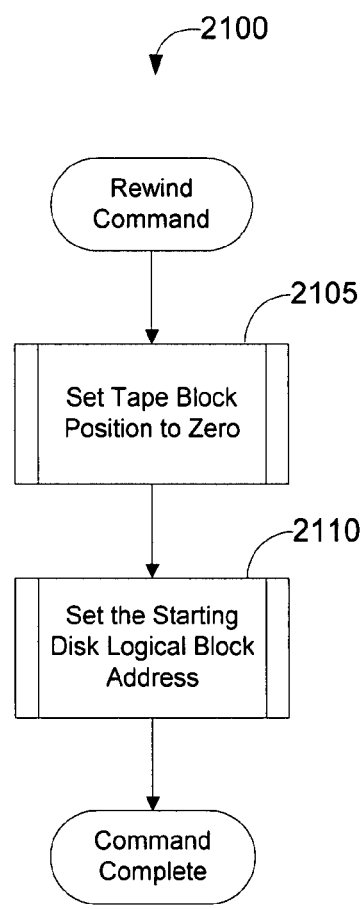

As shown in FIG. 21, a Rewind media access command 2100 updates the TapeBlockPosition and DiskLogicalBlockAddress parameters to the starting tape block position of the virtual tape volume. The TapeBlockPosition is set to zero 2105 and the DiskLogicalBlockAddress is set to the starting disk sector logical block address 2110 of the virtual tape volume.

Figure 22:
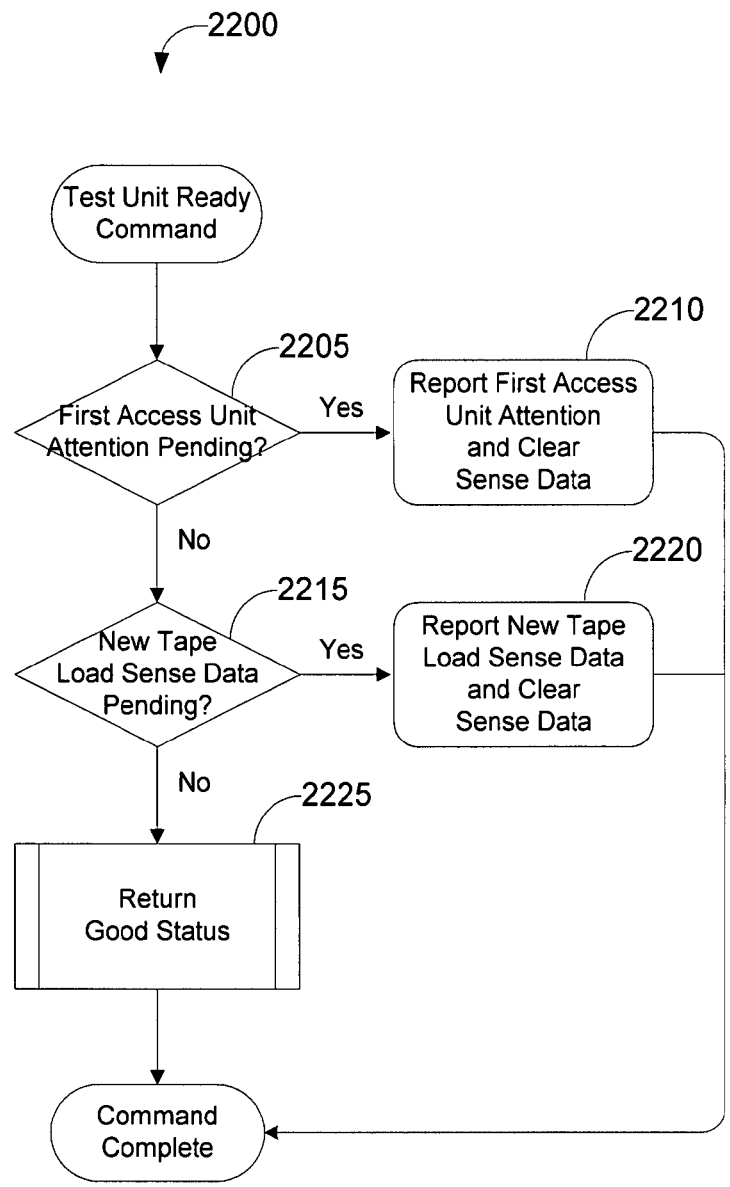

FIG. 22 illustrates a Test Unit Ready command 2200 that uses an interlocked protocol to simulate the not ready to ready sequences of a conventional tape device. If a unit attention first access 2205 occurs, it is reported and the sense data is cleared 2210. Then, when a virtual tape volume is first loaded 2215, the first received command gets sense data indicating a new tape load has occurred 2220. Afterwards, good status is returned 2225 allowing normal access to the virtual tape device.

Figure 23:
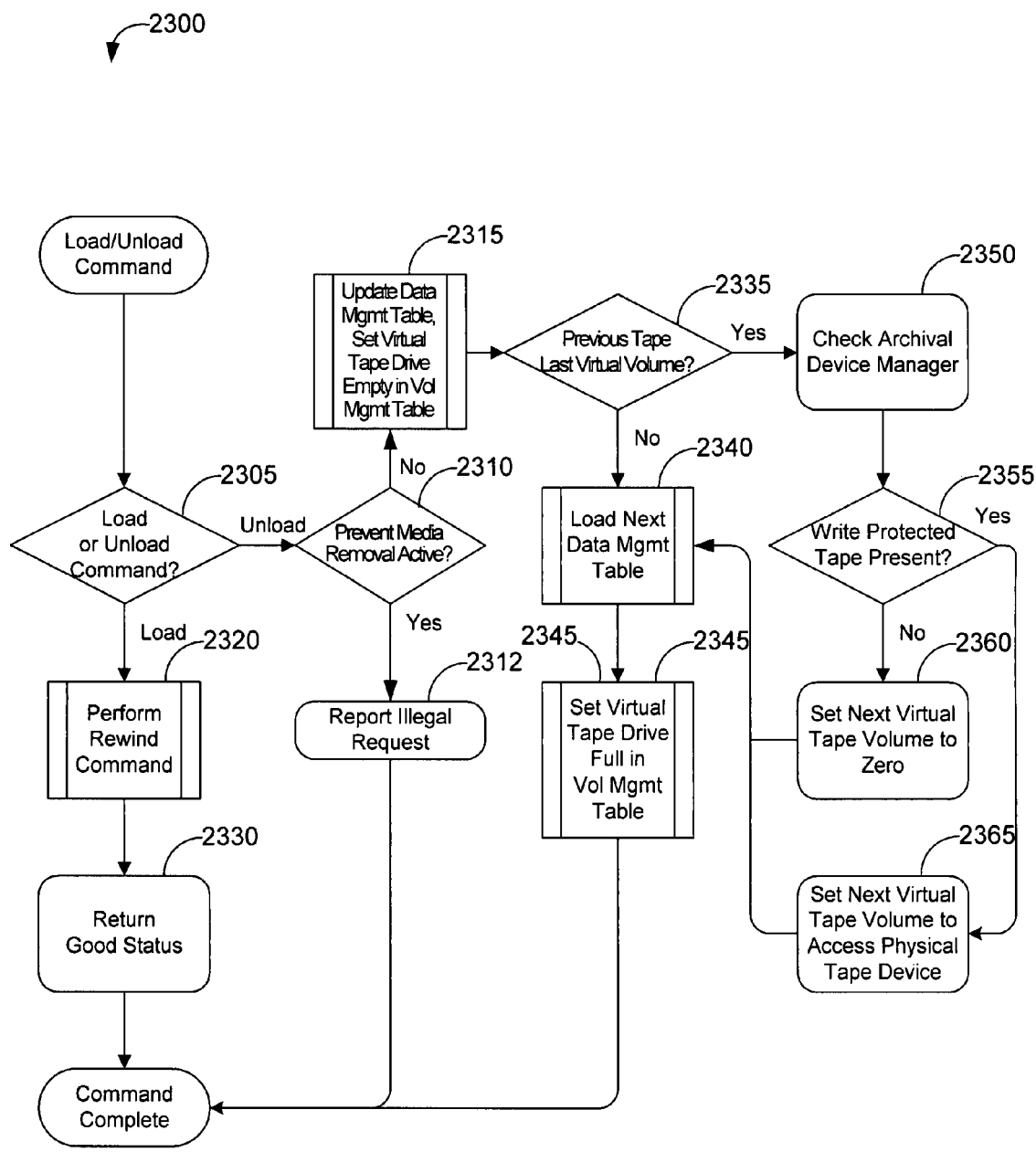

FIG. 23 illustrates a Load/Unload command 2300 that uses an interlocked protocol to simulate the load/unload sequences of a conventional tape device. If the load bit set to one 2310, the Load command is processed the same as a Rewind command 2320, as described above. Otherwise, if the load bit is set to zero, the prevent media removal state of the virtual tape drive is checked to allow the virtual tape drive to be unloaded. If prevent media removal is active, the unload command is terminated with a check condition status with a request sense data buffer constructed to report an illegal request error condition; and the request sense data buffer flag is set to a valid state. If prevent media removal is not active, the volume data management table is updated 2315 to record any pending write operations and the volume management table is updated to indicate the virtual tape drive is empty. If the previous virtual tape volume was not the last volume 2335, then the next virtual data management table is loaded 2340. The virtual data management table parameters are initialized as follows: TapeBlockPosition=0; DiskLogicalBlockAddress=starting sector for the active virtual tape volume; TapeBlockSize=position zero; NextFileMark=tape block position of the first File Mark+1, if no file marks are present NextFileMark=0; NextSetMark=tape block position of the first Set Mark+1, if no file marks are present NextSetMark=0; NextBlockSize=tape block position of the next block size change+1, if no block size changes are present NextBlockSize=0; EndOfData=current End-of-Data tape block position; VTS_TapeDrive flag set to force the first received command to get a check condition status indicating a new tape load has occurred. If the previous virtual tape volume was greater than or equal to the last volume 2335, then the archival tape device(s) is checked 2350. If a write protected tape cartridge is present 2355, then the next available virtual tape device is set to operate the physical tape device directly 2365. Otherwise, the next virtual tape volume is set to the first one 2360 so as to loop from the last virtual tape volume to the first virtual tape volume.

Continuous Read/Write Commands

Figure 24A:
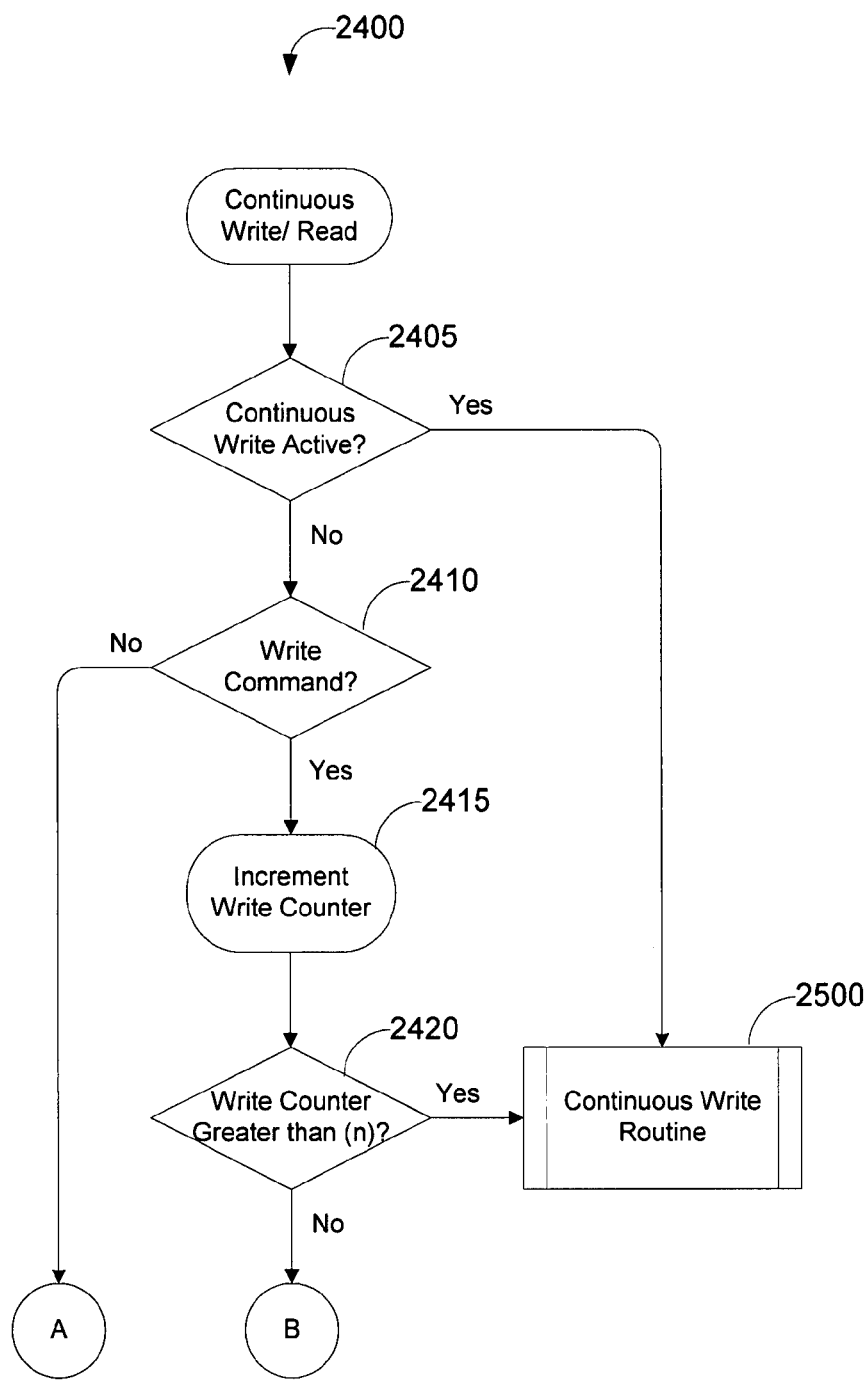
FIGS. 24-26 are detailed flow diagrams for continuous read and write commands.
Figure 24B:
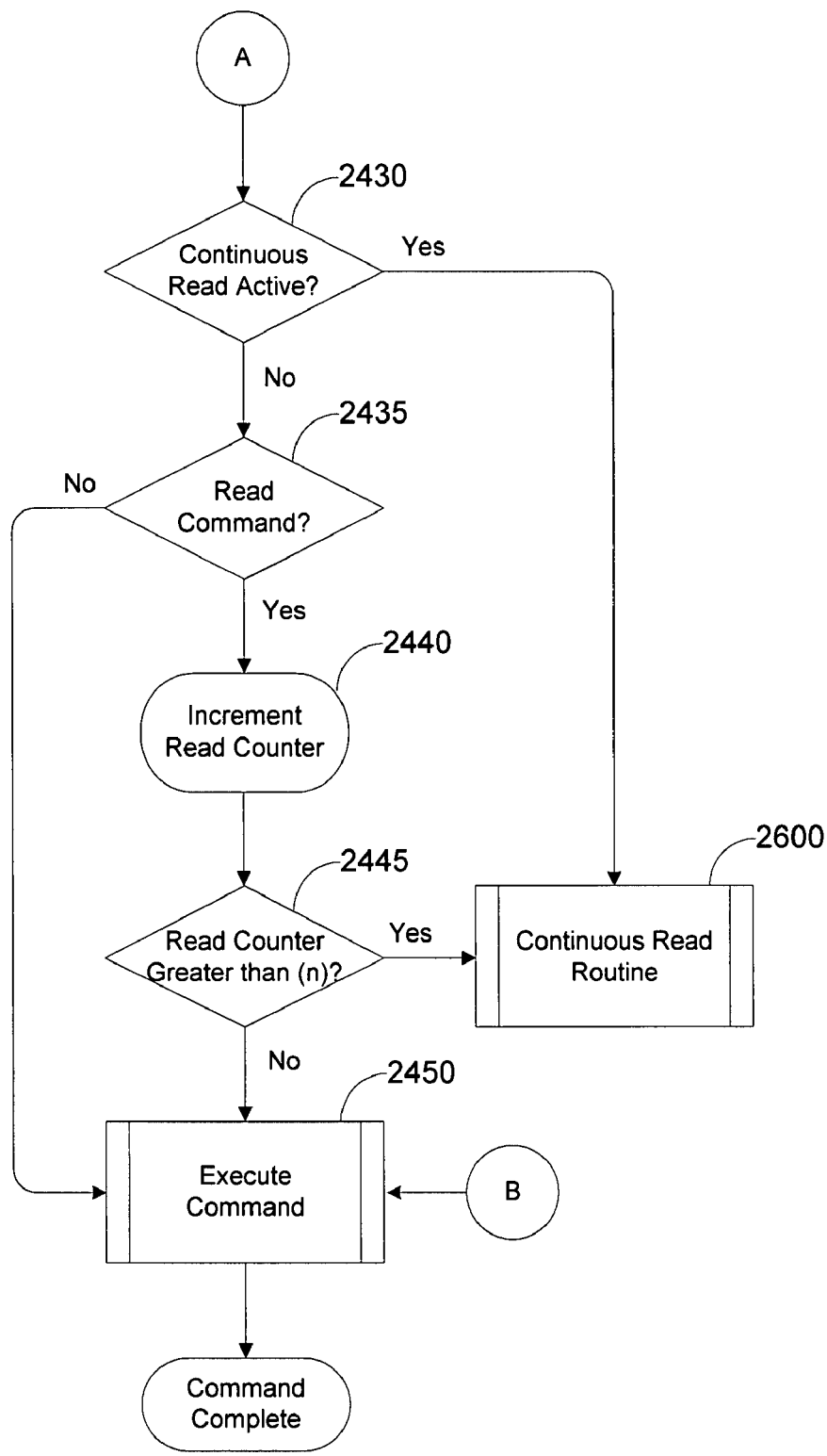
Figure 25:
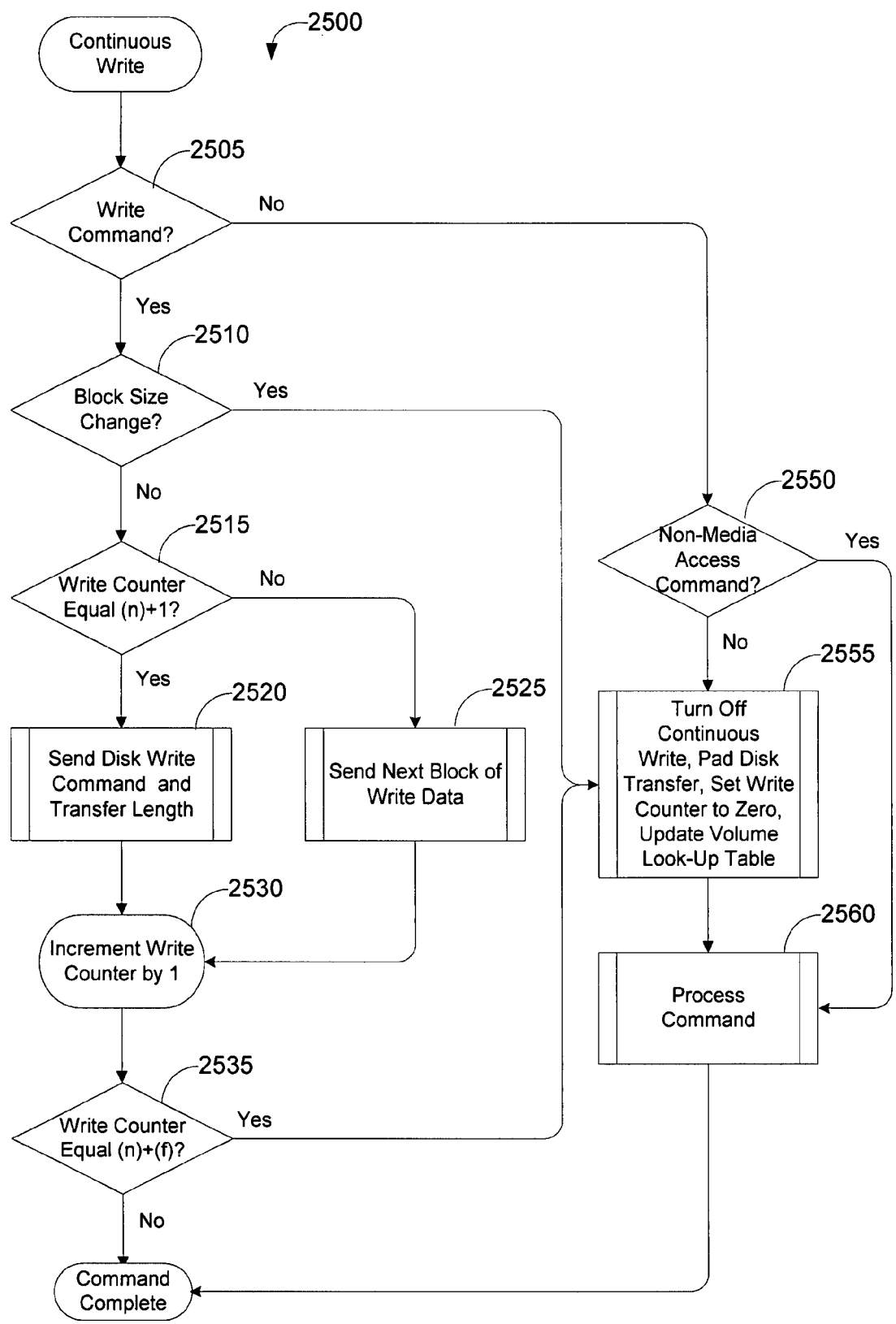
Figure 26:
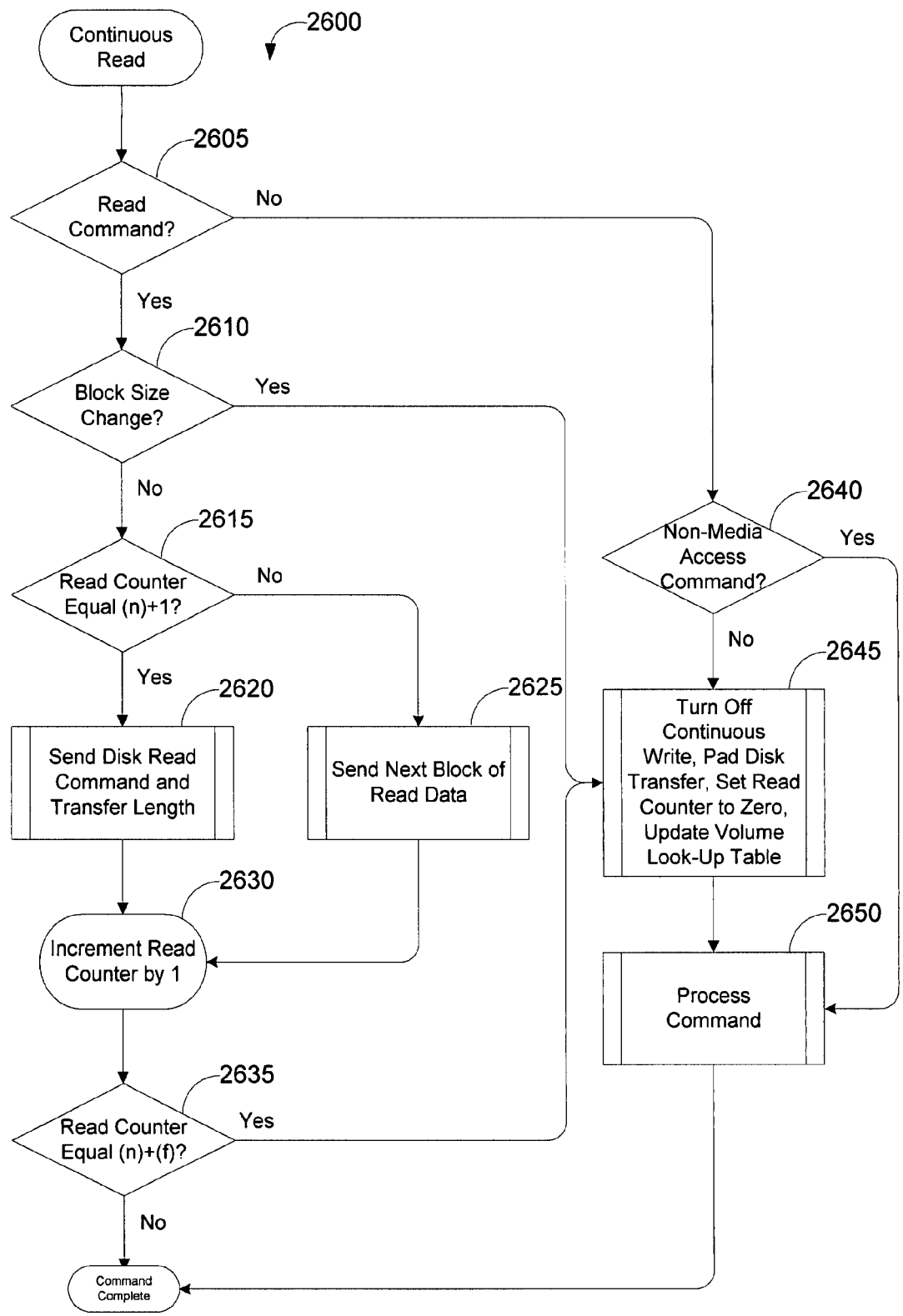

FIGS. 24-26 illustrate continuous read/write logic 2400 that advantageously enhances the performance of the virtual tape system 300 (FIG. 3) by reducing command overhead. Specifically, the commands and command responses associated with processing multiple sequential tape blocks one at a time are eliminated. A continuous read command or a continuous write command is invoked after a specified number of blocks have been read or written. In response, a single read or write command with a larger transfer size is executed. The transfer size represents multiple tape blocks, such as sixteen or more. As each sequential tape block is processed, the continuous read/write logic remains active and tracks the progress of a data transfer to or from disk storage 330 (FIG. 3). After all of the tape blocks have been transferred, the single larger disk storage command is complete. At this point, the continuous read/write logic is no longer active.

As shown in FIG. 24A, if a continuous write is active 2405, then the continuous write routine is called 2500. Otherwise, if there is a write command 2410, then a write counter is incremented 2415. If the write counter is greater than a predetermined number 2420, then the continuous write is activated 2500. Otherwise, the write command is simply executed 2450.

As shown in FIG. 24B, if the command is not a write 2410 and continuous read is active 2430, then the continuous read routine is called 2600. Otherwise, if there is a read command 2435, then a read counter is incremented 2440. If the read counter is greater than a predetermined number 2445, then the continuous read is activated 2600. Otherwise, the read command is simply executed 2450.

FIG. 25 illustrates a continuous write routine 2500. If there is a write command 2505, no block size change 2510 and the write counter just exceeded the predetermined number 2515, then a disk write command is executed with a specified transfer length 2520. If the write counter previously exceeded the predetermined number 2515, then the next block of write data is sent 2425. The write counter is incremented 2530 and checked against the transfer length 2535. If the transfer length has not been reached, then the continuous write remains active. If, while the continuous write command is active a media access command is received that changes the current tape block size or position 2510, or the write counter indicates the continuous write transfer size is met 2535, or a non write media access command is received 2550, then the remaining portion of the data transfer is padded 2555 to complete the single larger disk storage command. At this point, the continuous write command logic is no longer active. The data management table 601 (FIG. 6) is updated to record the end of data position. The media access command is then processed 2560. If a non-media access command is received 2550, the personality logic processes the command transparently 2560 and the continuous write remains active. FIG. 26 illustrates a continuous read routine 2600, which functions analogous to the write routine 2500 (FIG. 25).

Non Media Access Commands

FIGS. 27-33 illustrate the non-media commands. The Inquiry command manages personality information to identify the virtual tape drive operational characteristics. The Read Block Limits command presents maximum and minimum supported block sizes. The Mode Sense and Mode Select commands manage mode sense page data to control how the virtual tape drive operates. The Log Sense and Log Select commands manage log sense page data to track write and read statistical counters. The Request Sense command manages request sense data to communicate more detailed command and status information related to the most recently executed command.

Figure 27:
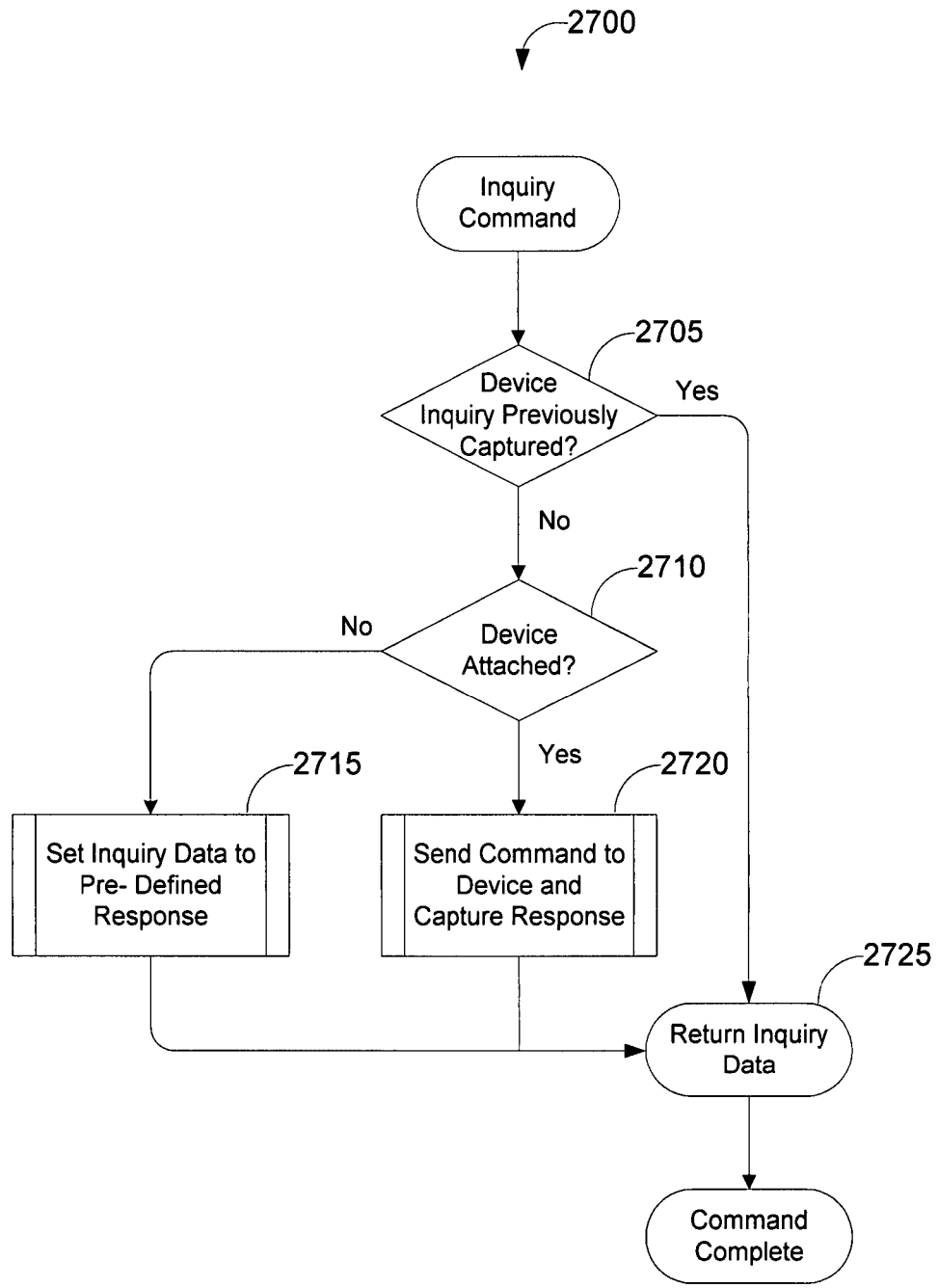
FIGS. 27-33 are detailed flow diagrams for various non-media commands.

As shown in FIG. 27, an Inquiry non-media access command 2700 returns virtual tape drive inquiry data 2725 based on if the requested inquiry command data has been previously captured 2705 and if a physical tape drive is attached 2710. In the case where no tape drive is attached, the inquiry data is set to a pre-defined response 2715 to provide a virtual tape drive personality.

Figure 28:
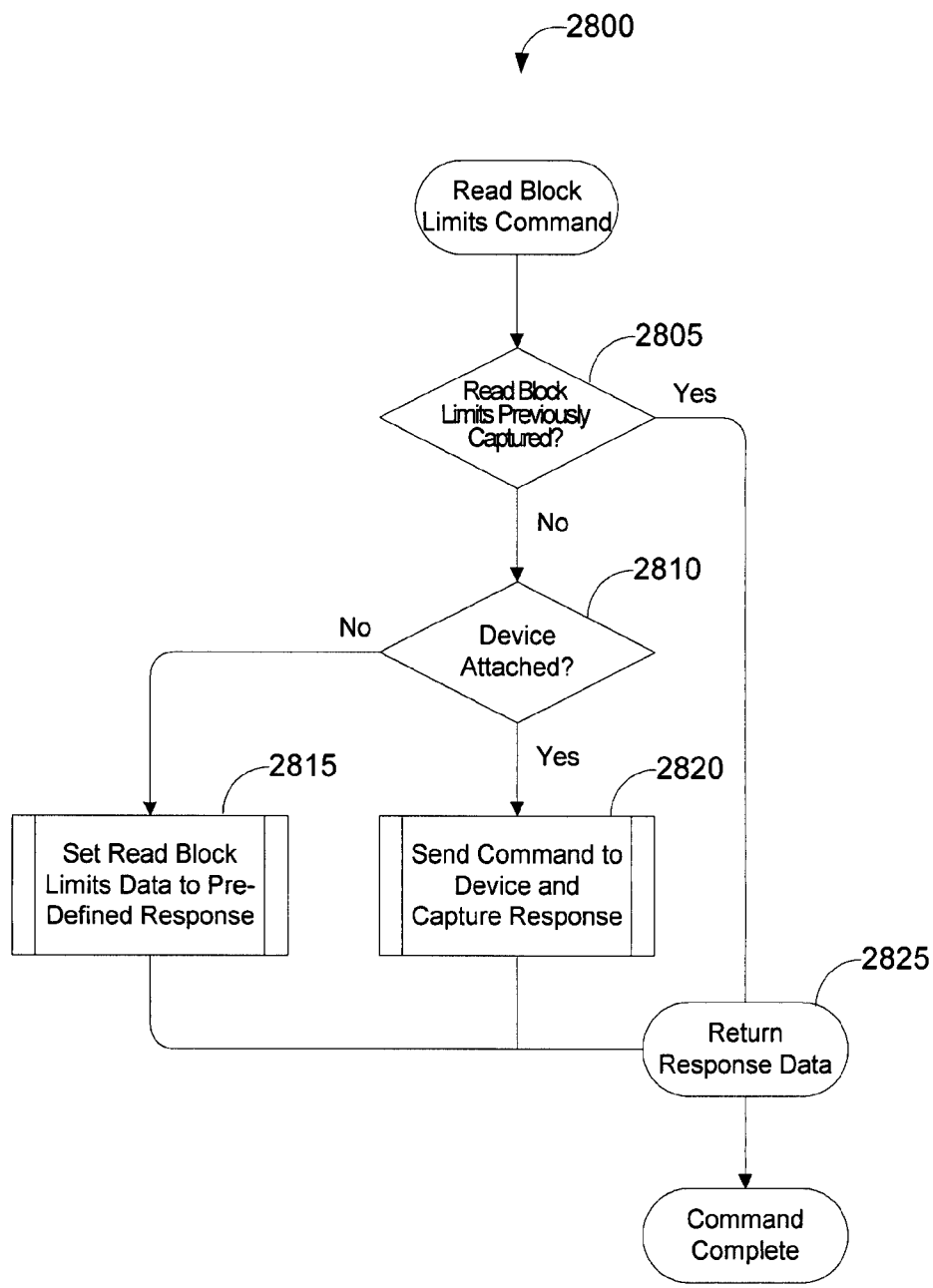

As shown in FIG. 28, a Read Block Limits non-media access command 2800 returns the read block limits data 2825 based on if the data has been previously captured 2805 and if a physical tape drive is attached 2810. In the case where no tape drive is attached, the read block limits data is set to a pre-defined response 2815.

Figure 29:
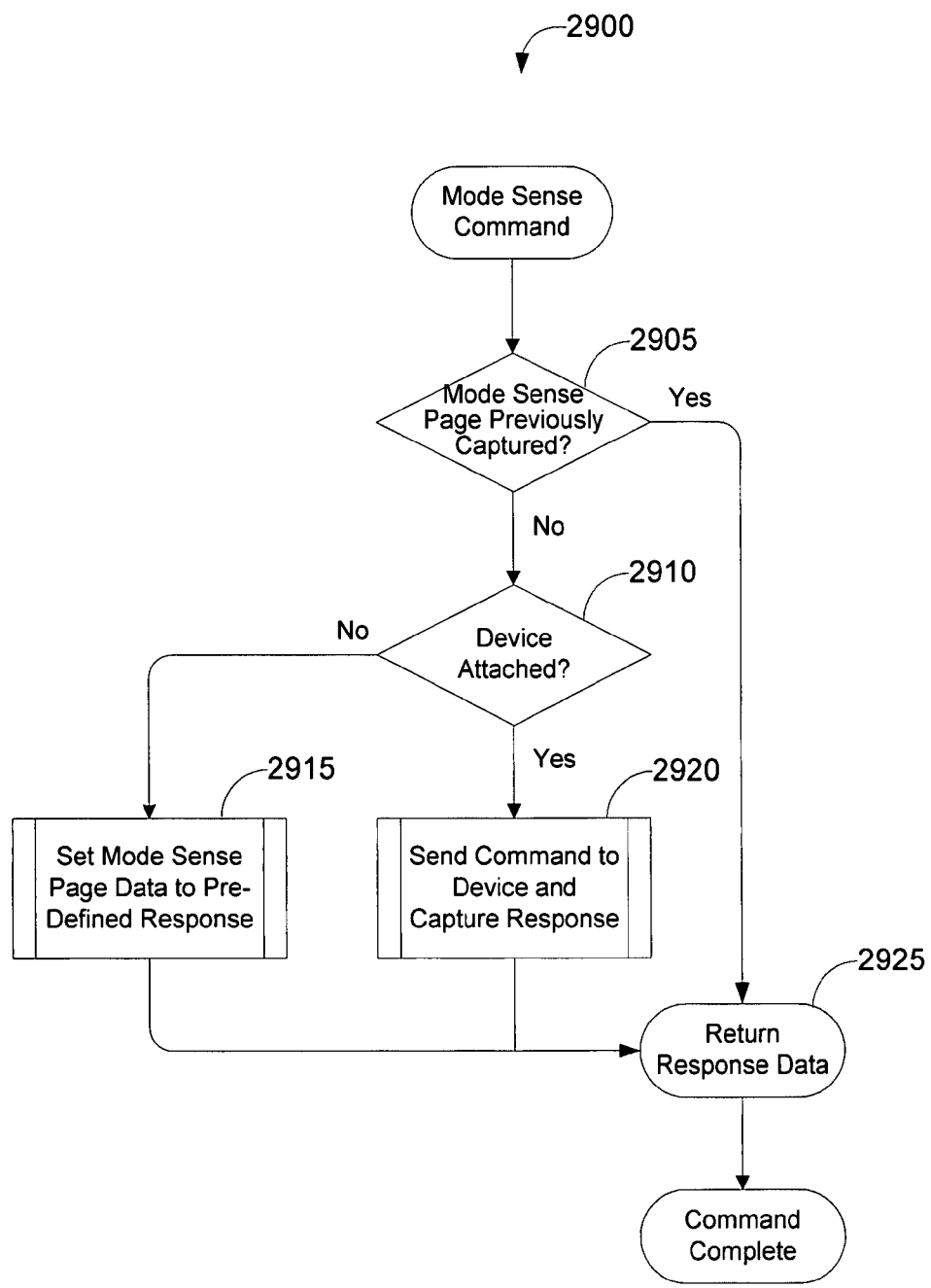

As shown in FIG. 29, a Mode Sense non-media access command 2900 returns the mode sense page data 2925 based on if the mode sense page data has been previously captured 2905 and if a physical tape drive is attached 2910. In the case where no tape drive is attached, the mode sense page data is set to a pre-defined response 2915 that is managed and updated using the Mode Select command.

Figure 30:
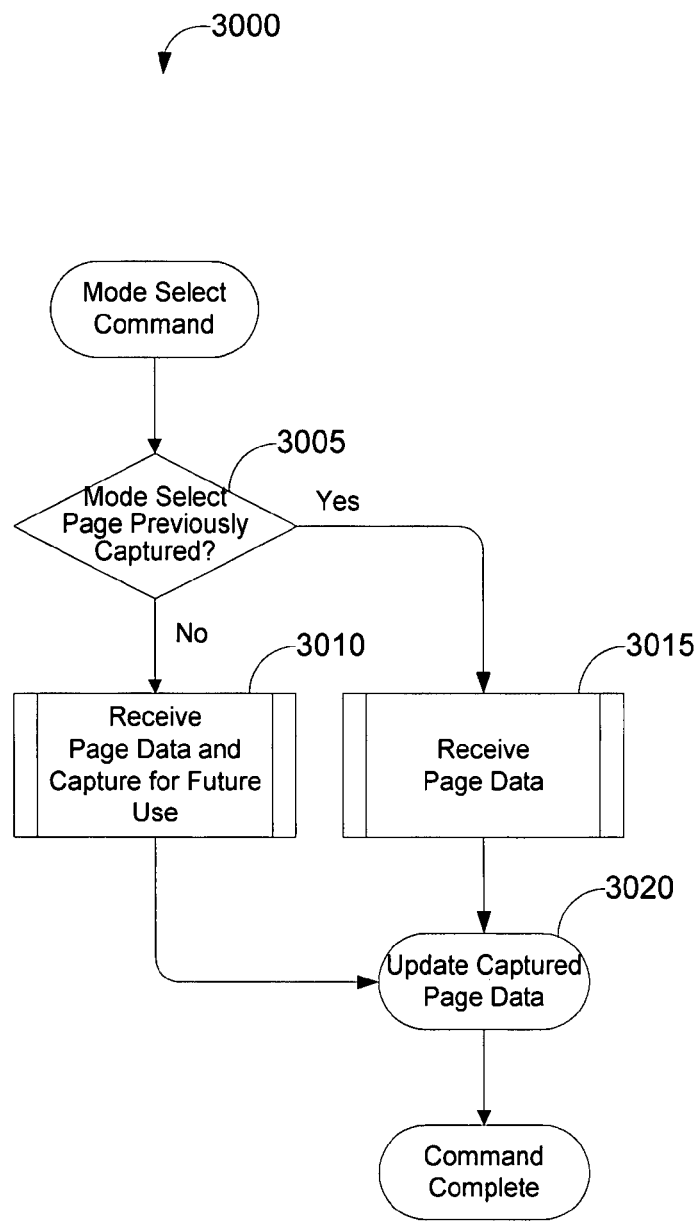

As shown in FIG. 30, a Mode Select non-media access command 3000 updates mode sense page data. If the mode select page data has been previously captured 3005, the modes select page data is updated 3015 along with the associated virtual tape drive parameters, such as TapeBlockPosition, ActiveCompressionMode, ActiveTapeDensity and ActivePartition 3020. Otherwise, the mode select page data is captured 3010 and the associated virtual tape drive parameters are updated 3020.

Figure 31:
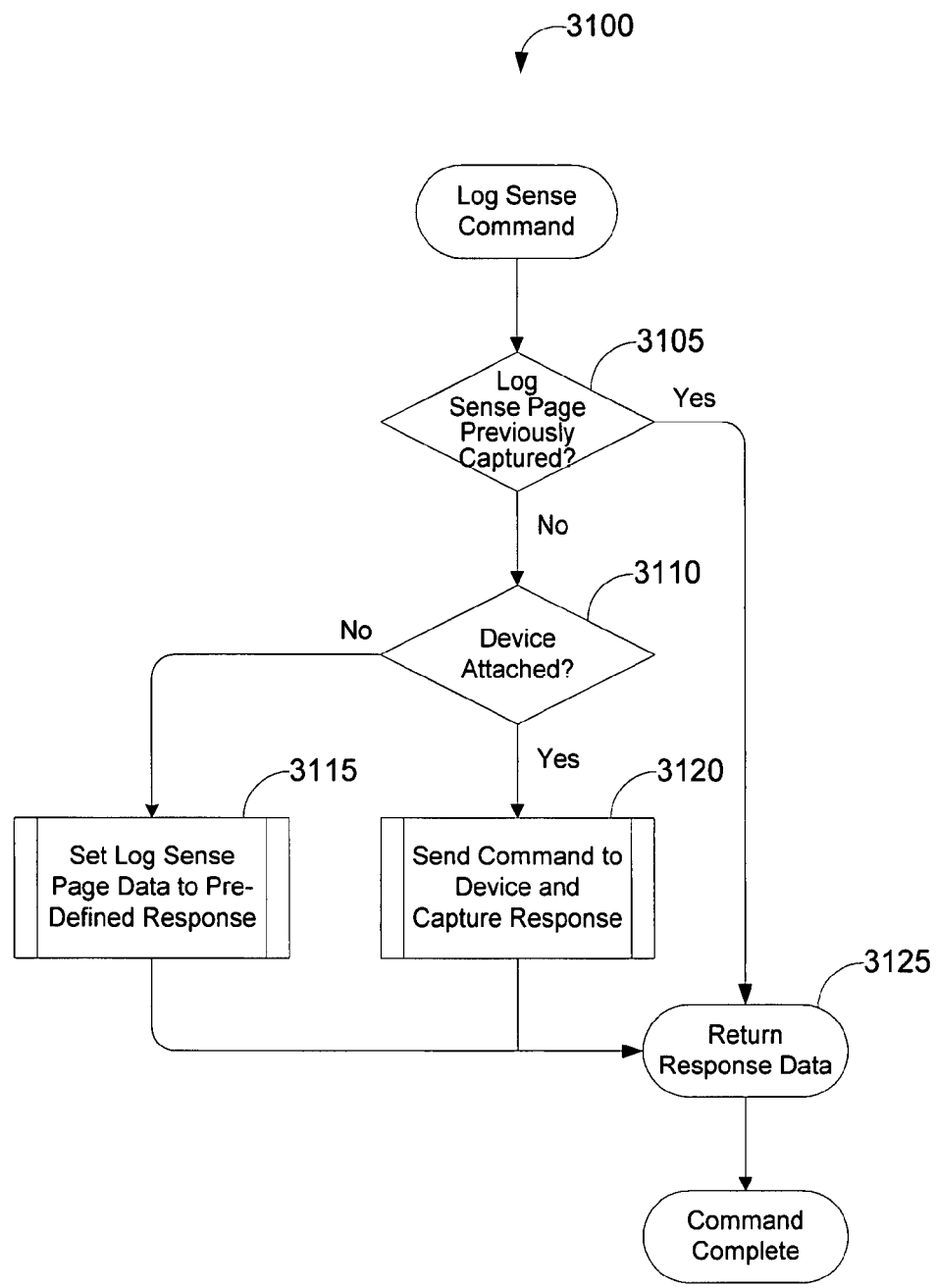
Figure 32:
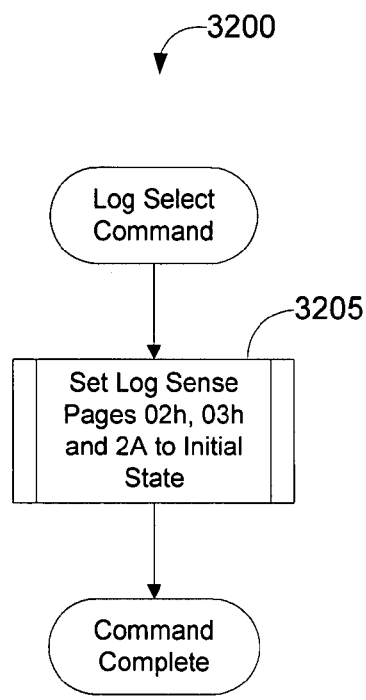

As shown in FIG. 31, a Log Sense non-media access command 3100 returns the log sense page data 3125 based on if the log sense page data has been previously captured 3105 and if a physical tape drive is attached 3110. In the case where no tape drive is attached, the log sense page data is set to a pre-defined response 3115. Otherwise, the log sense command is sent to the attached tape drive to capture the appropriate response 3120 for future use. As shown in FIG. 32, a Log Select non-media access command 3200 is used to initialize log sense page data and reset all statistical counters 3205 to a zero value.

Figure 33:
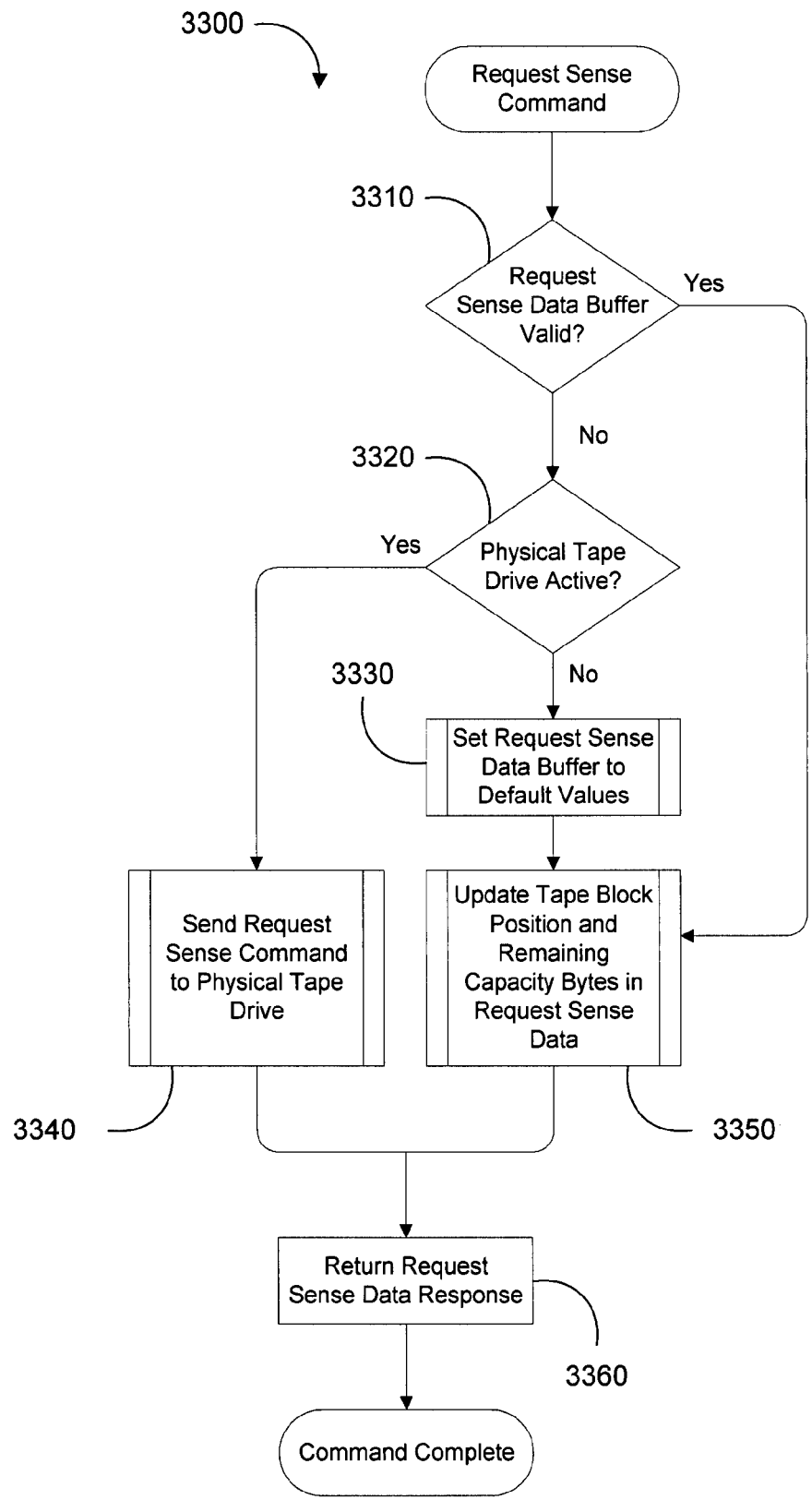

FIG. 33 illustrates a request sense command 3300. The request sense command manages request sense data buffer information for each virtual tape drive to communicate more detailed information relating to the status of the previous command processed. When the request sense command is processed, a flag to indicate the request sense data buffer information is valid is checked. If the request sense data buffer is not valid 3310, the request sense data buffer is set to default values 3330. If the virtual tape drive is loaded and currently points to one of the attached physical tape drives 3320, the request sense command is sent to the physical tape drive and processed directly. Otherwise, the current tape position and the remaining storage capacity are updated in the request sense data buffer 3350. After the request sense data buffer is updated, the request sense data response 3360 is returned to complete the command. The sense data buffer flag is then set to an invalid state.

Additional non-media access commands are also handled by the VTC including Prevent/Allow Media Removal, Reserve Unit, Release Unit, Send Diagnostics and Receive Diagnostics. FIG. 23 shows how the Prevent/Allow Media Removal 2310 command controls the sequential stacker operation and prevents or allows the next virtual tape volume to be loaded into the virtual tape drive. The VTC supports Write Buffer and Read Buffer commands to allow new controller firmware to be downloaded and flashed into an EEPROM as well as perform diagnostic write and read functions.

Archive Device Manager

Figure 34:
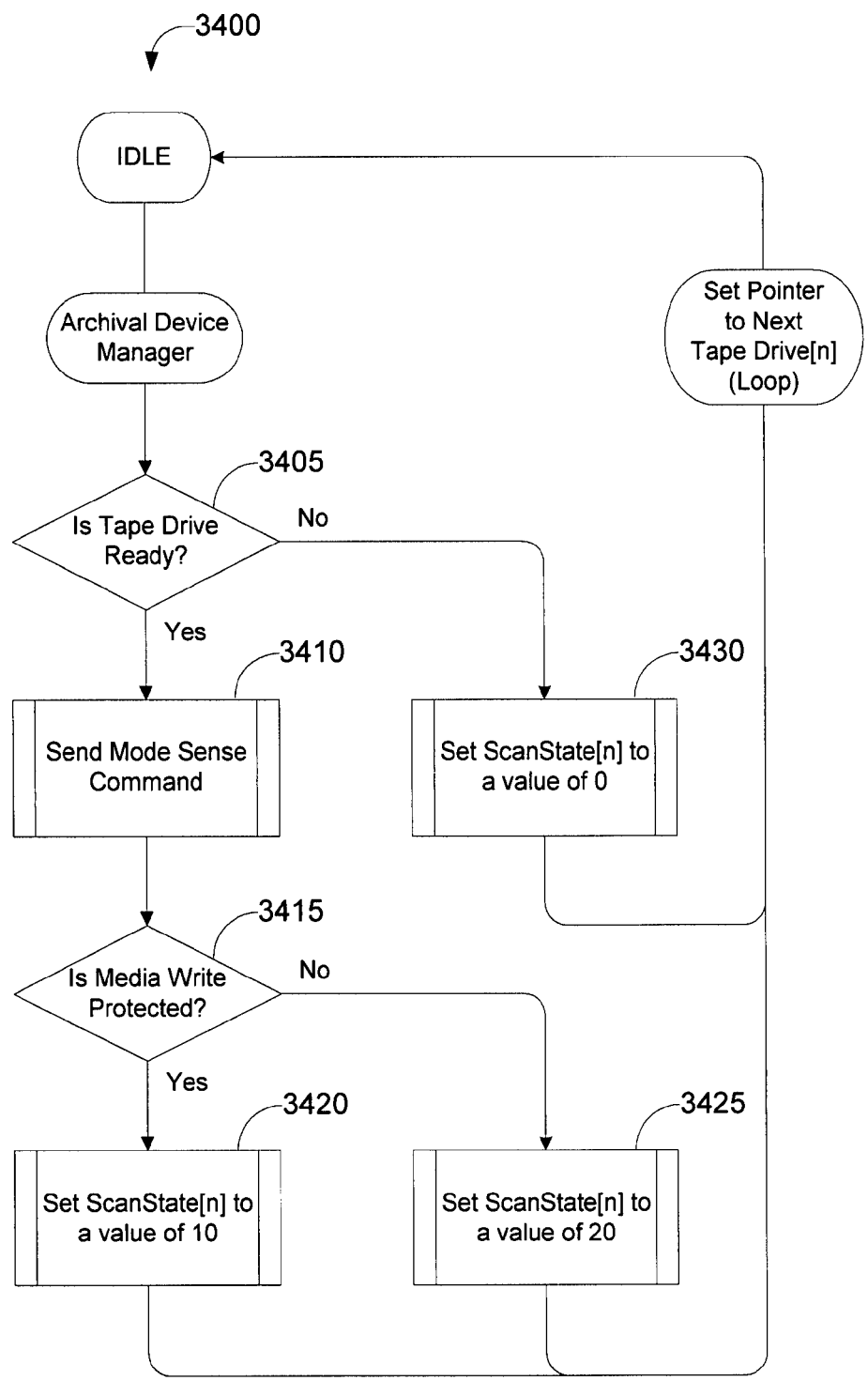
FIG. 34 is a detailed flow diagram for an archival device manager.

FIG. 34 illustrates the archive device manager 3400 that is used to monitor the empty/full state of each attached physical tape drive and uses a ScanState[n] array parameter to track the tape drive state. When a tape drive goes ready 3405 with a physical tape cartridge loaded, the archive device manager sends a mode sense command 3410 to determine if the media is write protected 3415. If the media is write protected, the ScanState[n] parameter 3420 is set to a value of 10, where n equals the relative tape device number (i.e. 0, 1, 2 . . . n). If the media is ready and write enabled, the ScanState[n] parameter 3425 is set to a value of 20. If the tape drive is not ready, the ScanState[n] parameter 3430 is set to a value of 0. If the ScanState[n] parameter is equal to 10, the VTC 400 (FIG. 4) includes the physical tape volume as part of the load/unload sequence to allow the condition where, after the last virtual tape volume is unloaded, the next tape volume to load into the virtual tape drive is the next physical write protected tape volume.

A tape storage emulator has been disclosed in detail in connection with various embodiments. These embodiments are disclosed by way of examples only and are not to limit the scope of the claims that follow. One of ordinary skill in art will appreciate many variations and modifications.

What is claimed is:

1. A tape storage emulator comprising:
   a disk storage;
   a tape storage;
   a server interface in communications with a server so as to receive and transmit tape storage commands and tape formatted data compatible with the tape storage;
   a data path control in communications with the server interface and the disk storage so as to transfer the tape formatted data between the disk storage and the server interface;
   a virtual tape management in communication with the disk storage so as to store the tape formatted data on the disk storage; and
   a personality logic at least temporarily in communications with the tape storage so as to capture and store tape storage responses,
   wherein the stored tape storage responses allow the virtual tape management to emulate the tape storage to the server using the disk storage.

* * * * *